(12) United States Patent
Heinzman et al.

(10) Patent No.: US 10,155,358 B2
(45) Date of Patent: Dec. 18, 2018

(54) POLYMERIC STRUCTURES COMPRISING A DUAL PURPOSE AND/OR COMPONENT THEREOF AND METHODS FOR MAKING SAME

(71) Applicant: The Procter & Gamble Company, Cincinnati, OH (US)

(72) Inventors: Stephen Wayne Heinzman, Cincinnati, OH (US); Jeffrey Allen Bowles, Bethel, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 699 days.

(21) Appl. No.: 14/619,137

(22) Filed: Feb. 11, 2015

(65) Prior Publication Data

US 2015/0225879 A1  Aug. 13, 2015

Related U.S. Application Data

(60) Provisional application No. 61/938,327, filed on Feb. 11, 2014.

(51) Int. Cl.

| | | |
|---|---|---|
| *B32B 5/02* | (2006.01) | |
| *D04H 1/425* | (2012.01) | |
| *D04H 1/4258* | (2012.01) | |
| *D04H 1/4309* | (2012.01) | |
| *D04H 1/64* | (2012.01) | |
| *D04H 3/005* | (2012.01) | |
| *D04H 3/013* | (2012.01) | |
| *D01F 2/00* | (2006.01) | |
| *D01F 2/24* | (2006.01) | |
| *D01F 9/00* | (2006.01) | |
| *D01F 1/10* | (2006.01) | |
| *B32B 5/26* | (2006.01) | |

(52) U.S. Cl.
CPC .............. *B32B 5/022* (2013.01); *B32B 5/028* (2013.01); *B32B 5/26* (2013.01); *D01F 1/10* (2013.01); *D01F 2/00* (2013.01); *D01F 2/24* (2013.01); *D01F 9/00* (2013.01); *D04H 1/425* (2013.01); *D04H 1/4258* (2013.01); *D04H 1/4309* (2013.01); *D04H 1/64* (2013.01); *D04H 3/005* (2013.01); *D04H 3/013* (2013.01); *B32B 2262/04* (2013.01); *B32B 2262/062* (2013.01); *B32B 2432/00* (2013.01); *B32B 2555/00* (2013.01); *Y10T 442/10* (2015.04)

(58) Field of Classification Search
USPC ............................................................ 442/1
See application file for complete search history.

(56) References Cited

U.S. PATENT DOCUMENTS 4,310,683 A * 1/1982 Longley ................ C07C 309/00
510/494
2013/0149928 A1 6/2013 Boylan et al.
(Continued)

OTHER PUBLICATIONS

PCT International Search Report dated May 12, 2015—5 pages.

*Primary Examiner* — Lynda Salvatore
(74) *Attorney, Agent, or Firm* — C. Brant Cook

(57) ABSTRACT

Hydroxyl polymer polymeric structures, for example fibrous elements, such as filaments and/or fibers, and more particularly to hydroxyl polymer fibrous elements that contain a dual purpose material and/or dual purpose material component, fibrous structures made therefrom, and methods for making same are provided.

19 Claims, 8 Drawing Sheets

(56) References Cited

U.S. PATENT DOCUMENTS

2013/0280508 A1 10/2013 Heinzman et al.
2013/0280979 A1 10/2013 McKee
2014/0308497 A1 10/2014 McKee et al.
2014/0308862 A1 10/2014 Heinzman et al.

* cited by examiner

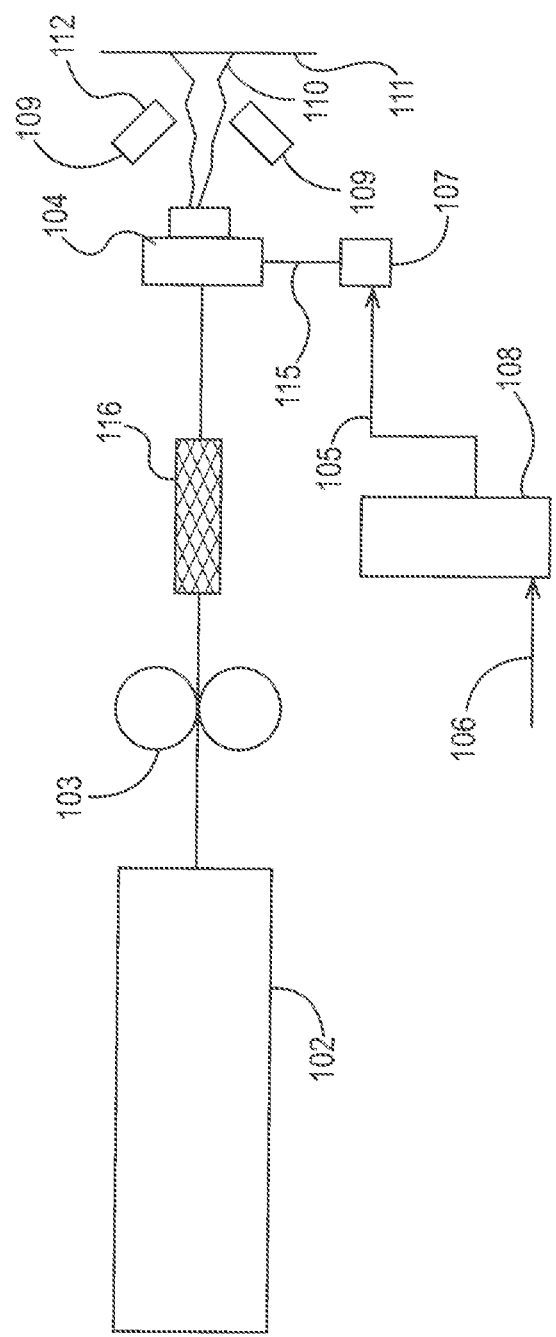

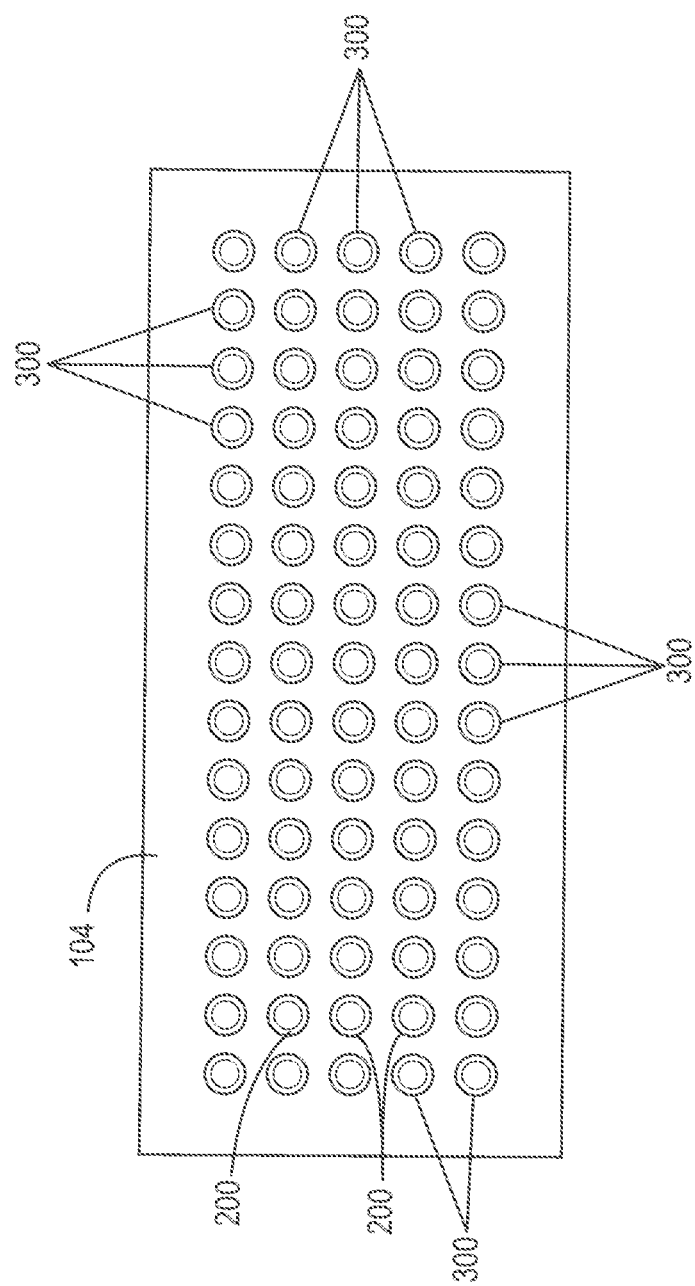

POLYMERIC STRUCTURES COMPRISING A DUAL PURPOSE AND/OR COMPONENT THEREOF AND METHODS FOR MAKING SAME

FIELD OF THE INVENTION

The present invention relates to hydroxyl polymer polymeric structures, for example fibrous elements, such as filaments and/or fibers, and more particularly to hydroxyl polymer fibrous elements that comprise a dual purpose material and/or dual purpose material component, fibrous structures made therefrom, and methods for making same.

BACKGROUND OF THE INVENTION

Hydroxyl polymer polymeric structures, such as fibrous elements, produced from crosslinking hydroxyl polymers are known in the art. It is known to crosslink hydroxyl polymers together via a crosslinking agent, such as a dihydroxyethyleneurea (DHEU), in combination with a crosslinking facilitator that prevents unacceptable crosslinking of the hydroxyl polymers by the crosslinking agent to occur. The challenge of managing the crosslinking of the hydroxyl polymers is especially problematic when spinning fibrous elements from an aqueous hydroxyl polymer melt composition.

Ammonium salts, such as ammonium chloride, ammonium sulfate, and ammonium citrate, are known to act as crosslinking facilitators within aqueous hydroxyl polymer melt compositions. Such ammonium salts are initially inactive crosslinking facilitators (catalysts) in the aqueous hydroxyl polymer melt compositions, but become active acid catalysts during heating of an embryonic polymeric structure formed from the aqueous hydroxyl polymer melt composition during a curing step. The problem with such ammonium salts, which are kosmotropic salts, such as ammonium sulfate and/or ammonium citrate, in the aqueous hydroxyl polymer melt composition at the level necessary for complete curing during the curing step, is that they can induce salting out of the hydroxyl polymer, which results in weaker polymeric structures formed therefrom during the polymer processing step.

Another negative that results from the addition of ammonium salts, such as ammonium chloride, ammonium sulfate, and ammonium citrate is increased uptake of water from storage of the polymeric structures under humid conditions. This results in a change in the tensile properties of the polymeric structures depending on atmospheric environment which is undesirable for consumer products, such as sanitary tissue products, employing the polymeric structures.

In addition to the negatives discussed above, the presence of ammonium sulfate in the aqueous hydroxyl polymer melt compositions lowers the Critical Micelle Concentration (CMC) of any fast wetting surfactants, such as sodium sulfosuccinate diester salts, present in the aqueous hydroxyl polymer melt compositions, which in turn decreases the fast wetting surfactants' wetting ability. This decreased wetting ability limits the fast wetting surfactants' ability to increase drying of the polymeric structures formed from the aqueous hydroxyl polymer melt compositions. This ultimately results in negatives in the fibrous elements, for example in increased diameters of fibrous elements formed from the aqueous hydroxyl polymer melt composition.

In addition, carboxylic ammonium salts, such as ammonium citrate, undesirably buffer the pre-cured polymeric structure's pH to above pH 5, which prevents complete crosslinking of the hydroxyl polymers to occur during the curing step.

Finally other salts, such as ammonium chloride, tend to also impart an undesirable yellow color to the polymeric structure during the high temperature of the curing step. Additionally, ammonium chloride causes corrosion of the processing equipment used to make the polymeric structure.

In light of the above, currently used crosslinking facilitators do not facilitate sufficient crosslinking of the hydroxyl polymers present in an aqueous hydroxyl polymer melt composition during the production of the polymeric structures to provide the polymeric structures with acceptable physical properties, such as strength, and color properties.

Formulators of non-aqueous polymer compositions such as non-aqueous polymer coating compositions useful is automobile repair finishing have utilized ammonium sulfosuccinate diester salts as an acid catalyst to activate amino resin crosslinking agents to produce a non-aqueous film coating. However, nowhere do the formulators of such non-aqueous polymer coating compositions teach or suggest using such ammonium sulfosuccinate diester salts in aqueous hydroxyl polymer melt compositions, especially for producing fibrous elements, such as filaments, from such aqueous hydroxyl polymer melt compositions.

Another problem is faced in cases where the fibrous elements are produced from aqueous polymer compositions, for example aqueous hydroxyl polymer melt compositions comprising hydroxyl polymers, such as polysaccharides. Hot drying air is used to remove water from the aqueous hydroxyl polymer melt compositions during spinning in order to produce the fibrous elements, which may be collected to form a fibrous structure. Removal of water from the incipient fibrous elements aids in inhibiting the fibrous elements from sticking to one another during the spinning and/or collecting processes. Failure to effectively remove water from the fibrous elements during formation results in relatively poor tensile properties, such as relatively lower fail stretch (FS), relatively lower total dry tensile (TDT), and/or relatively lower total energy absorbed (TEA), in the fibrous structures produced from the ineffectively dried fibrous elements. It is believed that these poor tensile properties in the fibrous structure are caused, at least in part, by excessive bonding of fibrous elements to one another that occurs when the fibrous elements are not effectively dried. However, the use of larger amounts of drying air is economically infeasible and energy intensive. In addition, ineffectively dried fibrous elements exhibit relatively larger average diameters, which impact various properties of the fibrous structures produced therefrom.

In the past, formulators have combined a crosslinking agent, such as DHEU, simple salts, such as ammonium chloride ($NH_4Cl$), and a fast wetting surfactant, such as a sodium sulfosuccinate diester salt, in an aqueous hydroxyl polymer melt composition to produce filaments. It has been unexpectedly found that the filaments spun from such an aqueous hydroxyl polymer melt composition and/or web formed from the filaments exhibit a salt level as represented by their Conductivity as measured according to the Conductivity Test Method described herein that is higher than desired (i.e., greater than 130 microsiemens) for consumer products, for example sanitary tissue products.

Accordingly, one problem faced by formulators of hydroxyl polymer polymeric structures from aqueous hydroxyl polymer melt compositions is the reduction of the level of salts (i.e., non-sulfosuccinate diester salts), such as ammonium chloride and/or sodium chloride and/or other simple salts, that have in the past been believed to be necessary for facilitating crosslinking via a crosslinking agent present in the hydroxyl polymer polymeric structures without negatively impacting the ability of the hydroxyl polymer polymeric structures to be dried (for example to have water removed therefrom).

Accordingly, there is a need for a dual purpose material, for example an ammonium and/or iminium sulfosuccinate diester salt, that performs both a crosslinking facilitator function as well as a fast wetting surfactant function within an aqueous hydroxyl polymer melt composition, which is spun into fibrous elements, such as filaments, while at the same time eliminating the need for additional salts, such as ammonium chloride and/or sodium chloride, being present in the aqueous hydroxyl polymer melt composition and/or fibrous elements produced therefrom as additional crosslinking facilitators.

SUMMARY OF THE INVENTION

The present invention fulfills the needs described above by providing an aqueous hydroxyl polymer melt composition comprising a dual purpose material that exhibits both a crosslinking facilitator (catalyst) function and a fast wetting surfactant (wetting) function, for example an ammonium and/or iminium sulfosuccinate diester salt, a polymeric structure, for example a fibrous element, made therefrom, a fibrous structure formed therefrom, and a method for making such a fibrous element and/or fibrous structure.

A solution to the problem identified above is to incorporate a dual purpose material that exhibits both a crosslinking facilitator (catalyst) function and a fast wetting surfactant (wetting) function, for example an ammonium and/or iminium sulfosuccinate diester salt into an aqueous hydroxyl polymer melt composition such that the dual purpose material and/or dual purpose material component(s) cause the following: 1) the water from the fibrous elements formed from the aqueous hydroxyl polymer melt composition is more effectively removed without increasing the level of drying air used to form the fibrous elements (evidence of the fast wetting surfactant function), 2) the salting out of the hydroxyl polymers does not occur in the aqueous hydroxyl polymer melt composition before crosslinking of the hydroxyl polymers within the polymeric structure, for example fibrous element, occurs in a curing step and thus formation of the polymeric structure, for example fibrous element (evidence of the mitigation of the salt level), 3) the hydroxyl polymer is not crosslinked prior to the polymer processing step (evidence of the crosslinking facilitator function), 4) the polymeric structure is effectively crosslinked during the curing step to provide the polymeric structure with acceptable physical properties, such as strength, both dry and wet (evidence of the crosslinking facilitator function), and/or 5) the cured polymeric structure has an acceptable color (not yellow) (evidence of the mitigation of the additional salts).

In one example of the present invention, a polymeric structure, for example a fibrous element, comprising a blend comprising a fibrous element-forming polymer, such as a hydroxyl polymer for example a crosslinked hydroxyl polymer, and one or more dual purpose materials and/or dual purpose material components, for example an ammonium and/or iminium sulfosuccinate diester salt and/or its ions and/or its sulfosuccinic acid diester and/or ammonia and/or amine, is provided.

In another example of the present invention, a fibrous structure comprising a plurality of fibrous elements of the present invention, is provided.

In still another example of the present invention, an aqueous hydroxyl polymer melt composition comprising a fibrous element-forming polymer, such as a hydroxyl polymer, and a crosslinking system comprising a crosslinking agent and a dual purpose material that exhibits both a crosslinking facilitator (catalyst) function and a fast wetting surfactant (wetting) function, for example an ammonium and/or iminium sulfosuccinate diester salt, is provided.

In yet another example of the present invention, a polymeric structure, such as a fibrous element, derived from an aqueous hydroxyl polymer melt composition of the present invention, is provided.

In even still yet another example of the present invention, a method for making a polymeric structure, for example a fibrous element, of the present invention comprising the steps of:
  a. providing an aqueous hydroxyl polymer melt composition comprising a fibrous element-forming polymer, such as a hydroxyl polymer, and a crosslinking system comprising a crosslinking agent and a dual purpose material that exhibits both a crosslinking facilitator (catalyst) function and a fast wetting surfactant (wetting) function, for example an ammonium and/or iminium sulfosuccinate diester salt; and
  b. polymer processing the aqueous hydroxyl polymer melt composition such that one or more polymeric structures, for example fibrous elements, are formed, is provided.

In even yet another example of the present invention, a method for making a fibrous structure of the present invention comprising the steps of:
  a. providing an aqueous hydroxyl polymer melt composition comprising a fibrous element-forming polymer, such as a hydroxyl polymer, and a crosslinking system comprising a crosslinking agent and a dual purpose material that exhibits both a crosslinking facilitator (catalyst) function and a fast wetting surfactant (wetting) function, for example an ammonium and/or iminium sulfosuccinate diester salt; and
  b. polymer processing the aqueous hydroxyl polymer melt composition such that a plurality of fibrous elements are formed;
  c. collecting the fibrous elements, for example in an inter-entangled manner, on a collection device such that a fibrous structure is formed, is provided.

In even still another example of the present invention, a single- or multi-ply sanitary tissue product comprising a fibrous structure of the present invention, is provided.

Accordingly, the present invention relates to polymeric structures, such as fibrous elements, comprising one or more dual purpose materials and/or dual purpose material components, for example an ammonium and/or iminium sulfosuccinate diester salt and/or its ions and/or its sulfosuccinic acid diester and/or ammonia and/or amine, an aqueous hydroxyl polymer melt composition comprising a dual purpose material that exhibits both a crosslinking facilitator (catalyst) function and a fast wetting surfactant (wetting) function, for example an ammonium and/or iminium sulfosuccinate diester salt, polymeric structures, for example fibrous elements, made from such aqueous hydroxyl polymer melt compositions, fibrous structures made from such fibrous elements, and processes for making same.

BRIEF DESCRIPTION OF THE DRAWINGS

FIG. 6 is a schematic representation of an example of a process for synthesizing a fibrous element in accordance with the present invention;

FIG. 9 is a view similar to that of FIG. 8 and showing one possible arrangement of orifices for providing a boundary air around the attenuation zone shown in FIG. 7.

DETAILED DESCRIPTION OF THE INVENTION

Definitions

Figure 1:
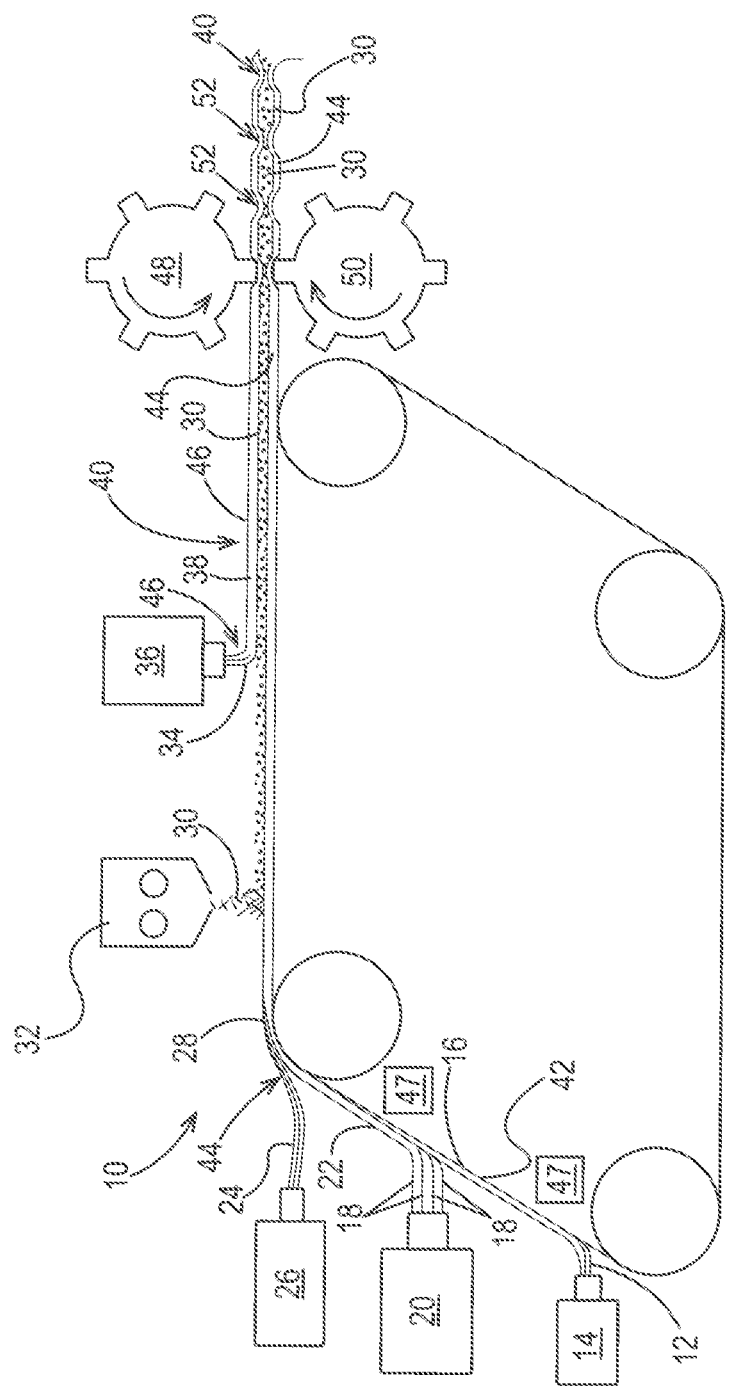
FIG. 1 is a schematic representation of one example of a method for making a fibrous structure according to the present invention.

"Polymeric structure" as used herein means any physical structure formed as a result of processing an aqueous hydroxyl polymer melt composition of the present invention into such a physical structure. Non-limiting examples of polymeric structures in accordance with the present invention include fibrous elements, films, coatings, and/or foams. The polymeric structures of the present invention are non-naturally occurring physical structures. In other words, they are man-made physical structures.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers can be used in the fibrous structures of the present invention.

"Fibrous structure" as used herein means a structure that comprises one or more fibrous elements. In one example, a fibrous structure according to the present invention means an association of fibrous elements that together form a structure capable of performing a function. In another example of the present invention, a fibrous structure comprises a plurality of inter-entangled fibrous elements, for example filaments.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention.

The sanitary tissue products and/or fibrous structures of the present invention may exhibit a basis weight between about 1 $g/m^2$ to about 5000 $g/m^2$ and/or from about 10 $g/m^2$ to about 500 $g/m^2$ and/or from about 10 $g/m^2$ to about 300 $g/m^2$ and/or from about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$ as determined by the Basis Weight Test Method described herein. In addition, the sanitary tissue product of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 $g/m^2$ to 100 $g/m^2$ as determined by the Basis Weight Test Method described herein.

The sanitary tissue products of the present invention may exhibit a total dry tensile strength of greater than about 59 g/cm and/or from about 78 g/cm to about 394 g/cm and/or from about 98 g/cm to about 335 g/cm. In addition, the sanitary tissue product of the present invention may exhibit a total dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a total dry tensile strength of less than about 394 g/cm and/or less than about 335 g/cm as measured according to the Elongation/Tensile Strength/TEA/Tangent Modulus Test Method described herein.

The sanitary tissue products of the present invention may exhibit a density of less than 0.60 $g/cm^3$ and/or less than 0.30 $g/cm^3$ and/or less than 0.20 $g/cm^3$ and/or less than 0.15 $g/cm^3$ and/or less than 0.10 $g/cm^3$ and/or less than 0.07 $g/cm^3$ and/or less than 0.05 $g/cm^3$ and/or from about 0.01 $g/cm^3$ to about 0.20 $g/cm^3$ and/or from about 0.02 $g/cm^3$ to about 0.15 $g/cm^3$ and/or from about 0.02 $g/cm^3$ to about 0.10 $g/cm^3$ as measured according to the Density Test Method described herein.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Scrim" as used herein means a material that is used to overlay solid additives present on and/or within a nonwoven substrate of the fibrous structures of the present invention such that the solid additives are positioned between the scrim and a layer of the fibrous structure. In one example, the scrim covers the solid additives such that they are positioned between the scrim and a surface of the nonwoven substrate of the fibrous structure. In another example, the scrim is a minor component (for example less than 25% of the basis weight) relative to the nonwoven substrate of the basis weight of the fibrous structure.

"Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Thermoplastic" as used herein means, with respect to a material, such as a fibrous element as a whole and/or a polymer within a fibrous element, that the fibrous element and/or polymer exhibits a melting point and/or softening point at a certain temperature, which allows it to flow under pressure.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Dual purpose material" as used herein means a chemical compound that exhibits both a crosslinking facilitator function and a fast wetting surfactant function. A non-limiting example of a dual purpose material includes ammonium and/or iminium sulfosuccinate diester salts.

"Dual purpose material component" as used herein is a chemical entity, such as a compound or an ion, that results from a dual purpose material upon processing of an aqueous hydroxyl polymer melt composition comprising the dual purpose material. Non-limiting examples of dual purpose material components include ammonium and/or iminium sulfosuccinate diester salts and/or their ions and/or their sulfosuccinic acid diester and/or ammonia and/or amines.

"Crosslinking facilitator" and/or "crosslinking facilitator function" as used herein means any material that is capable of activating a crosslinking agent thereby transforming the crosslinking agent from its unactivated state to its activated state. In other words, when a crosslinking agent is in its unactivated state, the hydroxyl polymer present in the aqueous hydroxyl polymer melt composition does not undergo unacceptable crosslinking. Unacceptable crosslinking causes the shear viscosity and n value to fall outside the ranges specified which are determined according to the Shear Viscosity of an Aqueous Hydroxyl Polymer Melt Composition Measurement Test Method, described herein. In the case of imidazolidinone crosslinking agents, the pH and the temperature of the aqueous hydroxyl polymer melt composition should be in the desired pH of from about 4.5 to about 8 as measured by the Aqueous Hydroxyl Polymer Melt Composition pH Test Method described herein; unacceptable crosslinking occurs outside these ranges.

"Fast wetting surfactant" and/or "fast wetting surfactant component" and/or "fast wetting surfactant function" as used herein means a surfactant and/or surfactant component, such as an ion from a fast wetting surfactant, for example a sulfosuccinate diester ion (anion), that exhibits a Critical Micelle Concentration (CMC) of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Aqueous hydroxyl polymer melt composition" or "aqueous polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a fibrous element-forming polymer, for example a hydroxyl polymer and an ammonium sulfosuccinate diester salt and/or acid are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Copolymer" as used herein means a polymer comprising two or more different monomeric units. In other words, the copolymer is derived from two or more different monomers. For example, the copolymer may comprise two different monomeric units. In another example, the copolymer may comprise three different monomeric units (terpolymer). In still another example, the copolymer may comprise more than three different monomeric units. The monomeric units may be introduced into the polymerization in any order. The copolymer of the present invention may be produced by any suitable polymerization process, for example a free radical polymerization, for example a random free-radical polymerization and/or living free-radical polymerization. The polymerization may be random or controlled by several means including, but not limited to, atom transfer radical polymerization (ATRP) and reversible addition-fragmentation chain-transfer polymerization (RAFT). In one example, the polymerization is an emulsion polymerization.

"Associate," "Associated," "Association," and/or "Associating" as used herein with respect to fibrous elements means combining, either in direct contact or in indirect contact, fibrous elements such that a fibrous structure is formed. In one example, the associated fibrous elements may be bonded together for example by adhesives and/or thermal bonds. In another example, the fibrous elements may be associated with one another by being deposited onto the same fibrous structure making belt.

"Average Diameter" as used herein, with respect to a fibrous element, is measured according to the Average Diameter Test Method described herein. In one example, a fibrous element of the present invention exhibits an average diameter of less than 50 µm and/or less than 25 µm and/or less than 20 µm and/or less than 15 µm and/or less than 10 µm and/or less than 6 µm and/or greater than 1 µm and/or greater than 3 µm.

"Basis Weight" as used herein is the weight per unit area of a sample reported in lbs/3000 ft$^2$ or g/m$^2$ as determined by the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Polymeric Structures—Fibrous Elements

The polymeric structures, for example fibrous elements, of the present invention comprise a fibrous element-forming polymer, such as a hydroxyl polymer, for example a cross-linked hydroxyl polymer, and a dual purpose material and/or dual purpose material component. In one example, the fibrous elements may comprise two or more fibrous element-forming polymers, such as two or more hydroxyl polymers. In another example, the fibrous elements may comprise two or more dual purpose materials and/or dual purpose material components. In another example, the fibrous element may comprise two or more fibrous element-forming polymers, such as two or more hydroxyl polymers, at least one of which is starch and/or a starch derivative and one of which is a non-starch and/or non-starch derivative, such as polyvinyl alcohol. In still another example, the fibrous elements of the present invention may comprise two or more fibrous element-forming polymers at least one of which is a hydroxyl polymer and at least one of which is a non-hydroxyl polymer.

In yet another example, the fibrous elements of the present invention may comprise two or more non-hydroxyl polymers. In one example, at least one of the non-hydroxyl polymers exhibits a weight average molecular weight of greater than 1,400,000 g/mol and/or is present in the fibrous elements at a concentration greater than its entanglement concentration ($C_e$) and/or exhibits a polydispersity of greater than 1.32. In still another example, at least one of the non-hydroxyl polymers comprises an acrylamide-based copolymer.

In one example, the fibrous element comprises a filament. In another example, the fibrous element comprises a fiber, such as a filament that has been cut into fibers.

In one example, the polymeric structure, for example fibrous element, such as a filament, of the present invention exhibits a conductivity of less than 110 and/or less than 100 and/or less than 90 and/or less than 85 and/or to about 0 and/or to about 5 and/or to about 10 microsiemens as measured according to the Conductivity Test Method described herein.

Fibrous Element-Forming Polymers

The aqueous hydroxyl polymer melt compositions of the present invention and/or polymer structures, for example fibrous elements, such as filaments and/or fibers, of the present invention that associate to form fibrous structures of the present invention contain at least one fibrous element-forming polymer, such as a hydroxyl polymer, and may contain other types of polymers such as non-hydroxyl polymers that exhibit weight average molecular weights of greater than 500,000 g/mol, and mixtures thereof as determined by the Weight Average Molecular Weight Test Method described herein.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol as determined by the Weight Average Molecular Weight Test Method described herein. Higher and lower molecular weight hydroxyl polymers may be used in combination with hydroxyl polymers having a certain desired weight average molecular weight.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate. In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000 as determined by the Weight Average Molecular Weight Test Method described herein.

The polysaccharides of the present invention may comprise non-cellulose and/or non-cellulose derivative and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch. In still another example, the hydroxyl polymer comprises Dent corn starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In one example, to generate rheological properties suitable for high-speed fibrous element spinning processes, the molecular weight of the natural, unmodified starch may be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol as determined by the Weight Average Molecular Weight Test Method described herein. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol. For ethoxylated starches with higher degrees of ethoxylation, for example a hydroxyethylated Dent corn starch with 5 wt % hydroxyethylation, weight average molecular weights of up to 40,000,000 g/mol as determined by the Weight Average Molecular Weight Test Method described herein may be suitable for the present invention. For acid thinned Dent corn starch, which tends to retrograde more than oxidized Dent corn starch, the appropriate weight average molecular weight is from about 100,000 g/mol to about 15,000,000 g/mol as determined by the Weight Average Molecular Weight Test Method described herein.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

In one example, the fibrous element-forming polymers may be present in the aqueous hydroxyl polymer melt composition at an amount of from about 20% to about 50% and/or from about 30% to about 50% and/or from about 35% to about 48% by weight of the aqueous hydroxyl polymer melt composition and present in a polymeric structure, for example fibrous element and/or fibrous structure, at a level of from about 50% to about 100% and/or from about 60% to about 98% and/or from about 75% to about 95% by weight of the polymeric structure, for example fibrous element and/or fibrous structure.

Other Polymers

The aqueous hydroxyl polymer melt compositions of the present invention and/or polymeric structures, for example fibrous elements, such as filaments of the present invention may comprise, in addition to the fibrous element-forming polymer, other polymers, such as non-hydroxyl polymers.

Non-limiting examples of suitable non-hydroxyl polymers that may be included in the fibrous elements of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500,00 g/mol and/or less than 2,000,000 g/mol and/or less than 1,750,000 g/mol as determined by the Weight Average Molecular Weight Test Method described herein.

In one example, the non-hydroxyl polymer exhibits a polydispersity of greater than 1.10 and/or at least 1.20 and/or at least 1.30 and/or at least 1.32 and/or at least 1.40 and/or at least 1.45.

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or Hyperfloc® NF221, NF301, and NF241 from Hychem, Inc.

In one example, the non-hydroxyl polymers may be present in an amount of from about 0.01% to about 10% and/or from about 0.05% to about 5% and/or from about 0.075% to about 2.5% and/or from about 0.1% to about 1%, by weight of the aqueous hydroxyl polymer melt composition, filament and/or fibrous structure.

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hydroxyl polymer comprises polyacrylamide. In one example, the fibrous elements comprises two or more non-hydroxyl polymers, such as two or more polyacrylamides, such at two or more different weight average molecular weight polyacrylamides.

In one example, the non-hydroxyl polymer comprises an acrylamide-based copolymer. In another example, the non-hydroxyl polymer comprises a polyacrylamide and an acrylamide-based copolymer. In one example, the acrylamide-based copolymer is derived from an acrylamide monomer and at least one monomer selected from the group consisting of: pendant hydroxyl-containing monomers, pendant hydroxyl alkylether-containing monomers, pendant hydroxyl alkylester-containing monomers, pendant hydroxyl alkylamide-containing monomers, and mixtures thereof. In one example, the acrylamide-based copolymer comprises an acrylamide monomeric unit and at least one monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof.

Crosslinking System

A crosslinking system comprising a crosslinking agent capable of crosslinking a hydroxyl polymer within an aqueous hydroxyl polymer melt composition, such as an imidazolidinone crosslinking agent, and a dual purpose material that exhibits both a crosslinking facilitator function and a fast wetting surfactant function, for example an ammonium and/or iminium sulfosuccinate diester salt, are present in the aqueous hydroxyl polymer melt composition and/or are added to the aqueous hydroxyl polymer melt composition before polymer processing of the aqueous hydroxyl polymer melt composition and/or the crosslinking agent and/or dual purpose material(s) and/or dual purpose material component(s), for example an ammonium and/or iminium sulfosuccinate diester salt, may be present in the polymeric structures, for example fibrous elements, produced from the aqueous hydroxyl polymer melt compositions of the present invention. In general any aqueous crosslinking system that benefits from a thermally triggered latent acid catalyst can be envisioned to employ a dual purpose material, for example an ammonium and/or iminium sulfosuccinate diester salt which speeds the removal of water and forms an acid (its sulfosuccinic acid diester) upon curing (for example upon heating). Examples of crosslinking systems which could use a dual purpose material of the present invention, for example an ammonium and/or iminium sulfosuccinate diester salt, include, in addition to dihydroxyethyleneurea, various amino resins e.g., melamine-formaldehyde, urea-formaldehyde, benzoguanamine-formaldehyde, glycoluril-formaldehyde, and methacrylamide-formaldehyde combined with hydroxyl functional acrylics and polyesters.

Upon crosslinking the hydroxyl polymer during the curing step, the crosslinking agent becomes an integral part of the polymeric structure as a result of crosslinking the hydroxyl polymer as shown in the following schematic representation:

Hydroxyl polymer-Crosslinking agent-Hydroxyl polymer

In addition, crosslinking facilitators that are not the dual purpose materials of the present invention, for example ammonium and/or iminium sulfosuccinate diester salts, can be present as synthesis byproducts of the dual purpose materials. For example in the synthesis of maleic diester, the synthetic precursor to the ammonium sulfosuccinic ester salt, an acid catalyst such as toluenesulfonic acid is used in the esterification process. In the next step in the synthesis of the ammonium sulfosuccinic ester salt, ammonium bisulfite is reacted with the double bond. Ammonium bisulfite will also neutralize the toluenesulfonic acid used in the esterification to give the ammonium salt of the toluenesulfonic acid which can beneficially remain in the ammonium sulfosuccinic ester salt preparation.

In one example of the present invention, a crosslinking system comprising a crosslinking agent capable of crosslinking a fibrous element-forming polymer, for example a hydroxyl polymer, and a dual purpose material of the present invention are present in an aqueous hydroxyl polymer melt composition of the present invention. Melt processing of the aqueous hydroxyl polymer melt composition, for example polymer processing the aqueous hydroxyl polymer melt composition into fibrous elements and then subjecting the fibrous elements to a curing step results in crosslinking of the hydroxyl polymer producing a crosslinked hydroxyl polymer, for example a crosslinked polysaccharide such as a crosslinked starch.

The crosslinking agent and/or dual purpose material may be added to the aqueous hydroxyl polymer melt composition, for example before polymer processing of the aqueous hydroxyl polymer melt composition. The crosslinking agent and/or dual purpose material and/or dual purpose material component(s) may be present in the fibrous elements produced from the aqueous hydroxyl polymer melt compositions of the present invention.

In one example, the crosslinking agent may be present in the aqueous hydroxyl polymer melt composition at a level of from about 0.25% to about 6% and/or from about 0.5% to about 5% and/or from about 0.5% to about 4% by weight of the aqueous hydroxyl polymer composition and present in a polymeric structure, for example fibrous element and/or fibrous structure, at a level of from about 0.5% to about 10% and/or from about 0.5% to about 8% and/or from about 1% to about 7% by weight of the polymeric structure, for example fibrous element and/or fibrous structure.

Dual Purpose Material/Dual Purpose Material Component

Non-limiting examples of suitable dual purpose materials include ammonium and/or iminium sulfosuccinate diester salts and/or derivatives of the ammonium and/or iminium sulfosuccinate diester salts. One function of the dual purpose material, the crosslinking facilitator function, is to activate a crosslinking agent present within an aqueous hydroxyl polymer melt composition of the present invention under conditions of activation, thereby transforming the crosslinking agent from its unactivated state to its activated state such that the crosslinking agent crosslinks the hydroxyl polymer(s) within the aqueous hydroxyl polymer melt composition. In other words, when a crosslinking agent is in its unactivated state, the hydroxyl polymer present in the aqueous hydroxyl polymer melt composition does not undergo unacceptable crosslinking, for example does not crosslink prior to being melt processed, for example spun, into a polymeric structure, such as a fibrous element.

Dual purpose materials of the present invention comprise one or more ammonium and/or iminium sulfosuccinate diester salts and/or their equivalent sulfosuccinic acid diesters that may exist after the transformation/activation of the crosslinking agent. For example, a crosslinking facilitator salt, such as an ammonium sulfosuccinate diester salt, being chemically changed to its sulfosuccinic acid diester form and vice versa. Non-limiting examples of suitable ammonium sulfosuccinate diester salts suitable for use as a dual purpose material in the present invention include ammonium salts of the following diesters: sulfosuccinic acid bis(isobutyl ester), sulfosuccinic acid bis(pentyl ester), sulfosuccinic acid bis(1,3-dimethylbutyl ester), and sulfosuccinic acid bis(2-ethylhexyl ester).

In one example, the polymeric structures, for example fibrous elements, comprise one or more dual purpose materials, such as an ammonium and/or iminium sulfosuccinate diester salt and/or its sulfosuccinic acid diester.

The ammonium and/or iminium sulfosuccinate diester salts of the present invention may have the following formula (I) depicted below.

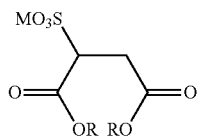

I wherein $MO_3S$ consists of $M^+$ and $^-O_3S$, where $M^+$ is an ammonium or iminium ion (cation), for example $^+NH_nR^2_{4-n}$ where n is 1-4 and/or 1-3 and/or 1-2 and/or 1; and $R^2$ is independently selected from the group consisting of: alkyl, hydroxyalkyl, alkanolamine, aryl, hydroxylaryl, or part of a heterocyclic ring, for example an aliphatic or aromatic N-heterocycle; and where R is a $C_1$-$C_{18}$ linear or branched alkyl and/or a $C_1$-$C_{12}$ linear or branched alkyl and/or a $C_1$-$C_8$ linear or branched alkyl group.

In one example, the ammonium and/or iminium sulfosuccinate diester salt is made by reacting a sulfosuccinic acid diester and an amine as depicted below in Formula II.

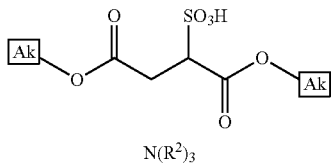

II where Ak is a $C_1$-$C_{18}$ linear or branched alkyl and/or a $C_1$-$C_{12}$ linear or branched alkyl and/or a $C_1$-$C_8$ linear or branched alkyl group; and R is H, alkyl, hydroxyalkyl, alkanolamine, or part of a heterocyclic ring, for example an aliphatic or aromatic N-heterocycle.

The sulfosuccinic acid diester and amine are both dual purpose material components that are formed from the dual purpose material upon processing an aqueous hydroxyl polymer melt composition into a polymeric structure, for example a fibrous element, such as a filament, upon curing the polymeric structure.

Non-limiting examples of suitable alkyl groups (Ak) are selected from the group consisting of: methyl, ethyl, propyl, butyl, isobutyl, pentyl, isopentyl, 2-ethylhexyl, octyl, decyl, 2-propylheptyl, and dodecyl.

Non-limiting examples of the amine ($N(R^2)_3$) from which the ammonium and/or iminium is derived are ammonia, dimethylaminoethanol, diethylaminoethanol, dimethylaminopropanol, 2-amino-2-methyl-1-propanol, methyldiethanolamine, 4-ethylmorpholine, 4-methylmorpholine, 4,4-dimethyloxazolidine. In one example, the amine has a boiling point of less than about 270° C.

Non-limiting examples of suitable dual purpose materials are selected from the group consisting of: sulfosuccinic acid bis(isobutyl ester) ammonium salt; sulfosuccinic acid bis(pentyl ester) ammonium salt; sulfosuccinic acid bis(2-ethylhexyl ester) ammonium salt where the ammonium cation is derived from ammonia, dimethylaminoethanol, diethylaminoethanol, dimethylaminopropanol, 2-amino-2-methyl-1-propanol, methyldiethanolamine, 4-ethylmorpholine, 4-methylmorpholine, 4,4-dimethyloxazolidine.

The dual purpose material may be present in the polymeric structure, such as a fibrous element, for example a filament, at a level of from about 0.1% to 5% and/or from about 0.15% to about 4% and/or from about 0.2% to about 2% by weight of the polymeric structure, for example fibrous element, such as a filament.

Another function that is exhibited by the dual purpose material and/or one or more dual purpose material components is the fast wetting surfactant function. For example, the dual purpose material and/or a dual purpose material component of the present invention may exhibit a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m.

In still another example, the dual purpose material and/or one or more dual purpose material components of the present invention exhibit a Critical Micelle Concentration (CMC) of greater than 0.15% and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or dual purpose material and/or one or more dual purpose material components of the present invention exhibit a CMC of at least 1.0% and/or at least 1.25% and/or at least 1.4% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m. CMC and Minimum Surface Tension in Distilled Water values of surfactants can be measured by any suitable methods known in the art, for example those methods described in Principles of Colloid and Surface Chemistry, p 370-375, incorporated herein by reference.

Additional Crosslinking Facilitators

In addition to the dual purpose material, for example an ammonium and/or iminium sulfosuccinate diester salts, other non-dual purpose material crosslinking facilitators may be present in the aqueous hydroxyl polymer melt composition and/or polymeric structure, for example fibrous element, formed from the aqueous hydroxyl polymer melt composition. Non-limiting examples of such other non-dual purpose material crosslinking facilitators include ammonium salts of methanesulfonic acid, ethanesulfonic acid, propanesulfonic acid, isopropylsulfonic acid, butanesulfonic acid, isobutylsulfonic acid, sec-butylsulfonic acids, benzenesulfonic acid, toluenesulfonic acid, xylenesulfonic acid, cumenesulfonic acid, alkylbenzenesulfonic, alkylnaphthalenedisulfonic acids. Other examples of non-dual purpose material ammonium salts include ammonium salts from the following amines: dimethylaminoethanol, diethylaminoethanol, dimethylaminopropanol, 2-amino-2-methyl-1-propanol, methyldiethanolamine, 4-ethylmorpholine, 4-methylmorpholine, 4,4-dimethyloxazolidine. In one example, that amine from which the non-dual purpose material ammonium salt is produced exhibits a boiling point of less than about 270° C. In another example, the dual purpose material, for example an ammonium sulfosuccinate diester salt, may be present in the aqueous hydroxyl polymer melt composition and/or polymeric structure, for example fibrous element, formed from the aqueous hydroxyl polymer melt composition, with one or more non-dual purpose material crosslinking facilitators, for example ammonium xylenesulfonate and/or ammonium toluenesulfonate.

However, in one example, to minimize the level of salts in the aqueous hydroxyl polymer melt composition and/or polymeric structure, for example a fibrous element, formed from the aqueous hydroxyl polymer melt composition of the present invention, the additional non-dual purpose material crosslinking facilitators, such as non-dual purpose material ammonium salts are minimized if not non-existent.

However, in another example, to minimize the level of kosmotropic salts in the aqueous hydroxyl polymer melt composition and/or polymeric structure, for example a fibrous element, formed from the aqueous hydroxyl polymer melt composition of the present invention, the additional non-dual purpose material kosmotropic crosslinking facilitators, such as non-dual purpose material kosmotropic ammonium salts are minimized if not non-existent. Non-kosmotropic salts such as ammonium salts of benzenesulfonic acid, toluenesulfonic acid, xylenesulfonic acid, cumenesulfonic acid, alkylbenzenesulfonic acids, and alkylnaphthalenesulfonic acids do not have to be minimized.

When present, the non-dual purpose material crosslinking facilitators are present in the polymeric structure, for example fibrous element, such as a filament, at a level of from about 0% to 5% and/or from about 0% to about 4% and/or from about 0% to about 2% and/or from about 0% to about 1% and/or from about 0.01% to about 0.75% and/or from about 0.025% to about 0.5% by weight of the polymeric structure, for example fibrous element, such as a filament.

In one example, polymeric structures, for example fibrous elements, such as filaments, and/or aqueous hydroxyl polymer melt compositions are void or essentially void (less than 0.025% by weight) of kosmotropic salts, such as ammonium sulfate and ammonium citrate. The inclusion 0.025% and greater of a kosmotropic salt, such as ammonium sulfate, even when an ammonium alkysulfonate salt and/or acid is present, may negatively impact the properties, such as strength (for example TEA), of the filaments. However, the inclusion of an amount of an ammonium salt, such as ammonium chloride, for example an amount that does not produce negative corrosive effects in the processing and spinning equipment, in combination with an ammonium alkylsulfonate salt may be present.

Hueing Agents

The aqueous hydroxyl polymer melt compositions and/or filaments of the present invention may comprise one or more hueing agents. In one example, the total level of one or more hueing agents present within one or more, for example a plurality, of the fibrous elements of a fibrous structure of the present invention is less than 1% and/or less than 0.5% and/or less than 0.05% and/or less than 0.005% and/or greater than 0.00001% and/or greater than 0.0001% and/or greater than 0.001% by weight of the dry fibrous element and/or dry fibrous structure formed by fibrous elements containing the hueing agents. In one example, the total level of one or more hueing agents present within one or more, for example a plurality, of the fibrous elements of a fibrous structure of the present invention is from about 0.0001% to about 0.5% and/or from about 0.0005% to about 0.05% and/or from about 0.001% to about 0.05% and/or from about 0.001% to about 0.005% by weight of the dry fibrous element and/or dry fibrous structure formed by fibrous elements containing the hueing agents.

Hueing agents can be used either alone or in combination. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Non-limiting examples of hueing agents include dyes, dye-clay conjugates, and organic and inorganic pigments and mixtures thereof. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and mixtures thereof. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C.I. Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO02011/98355, US 2012/225803 A1, US 2012/090102 A1, U.S. Pat. No. 7,686,892 B2, and WO2010/142503.

In another aspect, suitable polymeric dyes include polymeric dyes selected from the group consisting of hueing agents commercially available under the trade name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

In one example, a fibrous structure of the present invention comprising fibrous elements, such as filaments, comprising a hueing agent exhibits a Whiteness Index of greater than 72 and/or greater than 75 and/or greater than 77 and/or greater than 80 as measured according to the Whiteness Index Test Method described herein.

Solid Additives

The fibrous structures and/or sanitary tissue products of the present invention may further comprise one or more solid additives. "Solid additive" as used herein means an additive that is capable of being applied to a surface of a fibrous structure and/or nonwoven substrate of the fibrous structure in a solid form. In other words, the solid additive of the present invention can be delivered directly to a surface of the fibrous structure and/or nonwoven substrate of the fibrous structure without a liquid phase being present, i.e. without melting the solid additive and without suspending the solid additive in a liquid vehicle or carrier. As such, the solid additive of the present invention does not require a liquid state or a liquid vehicle or carrier in order to be delivered to a surface of a nonwoven substrate. The solid additive of the present invention may be delivered via a gas or combinations of gases. In one example, in simplistic terms, a solid additive is an additive that when placed within a container, does not take the shape of the container. In one example, a solid additive comprises a naturally occurring fiber, such as a pulp fiber.

The solid additives of the present invention may have different geometries and/or cross-sectional areas that include round, elliptical, star-shaped, rectangular, trilobal and other various eccentricities.

In one example, the solid additive may exhibit a particle size of less than 6 mm and/or less than 5.5 mm and/or less than 5 mm and/or less than 4.5 mm and/or less than 4 mm and/or less than 2 mm in its maximum dimension.

"Particle" as used herein means an object having an aspect ratio of less than about 25/1 and/or less than about 15/1 and/or less than about 10/1 and/or less than 5/1 to about 1/1. A particle is not a fiber as defined herein.

The solid additives may be present in the fibrous structures of the present invention at a level of greater than about 1 and/or greater than about 2 and/or greater than about 4 and/or to about 20 and/or to about 15 and/or to about 10 g/m$^2$. In one example, a fibrous structure of the present invention comprises from about 2 to about 10 and/or from about 5 to about 10 g/m$^2$ of solid additive.

In one example, the solid additives are present in the fibrous structures of the present invention at a level of greater than 5% and/or greater than 10% and/or greater than 20% to about 50% and/or to about 40% and/or to about 30%.

Scrim Material

The fibrous structure and/or sanitary tissue product may further comprise a scrim material. The scrim material may comprise any suitable material capable of bonding to the a nonwoven substrate of the fibrous structure of the present invention. In one example, the scrim material comprises a material that can be thermally bonded to the nonwoven substrate of the fibrous structure of the present invention. Non-limiting examples of suitable scrim materials include filaments of the present invention. In one example, the scrim material comprises filaments that comprise hydroxyl polymers. In another example, the scrim material comprises starch filaments. In yet another example, the scrim material comprises filaments comprising a thermoplastic polymer. In still another example, the scrim material comprises a fibrous structure according to the present invention wherein the fibrous structure comprises filaments comprising hydroxyl polymers, such as starch filaments, and/or thermoplastic polymers. In another example, the scrim material may comprise a film. In another example, the scrim material may comprise a nonwoven substrate according to the present invention. In even another example, the scrim material may comprise a latex.

In one example, the scrim material may be the same composition as the nonwoven substrate of the fibrous structure.

The scrim material may be present in the fibrous structures of the present invention at a basis weight of greater than 0.1 and/or greater than 0.3 and/or greater than 0.5 and/or greater than 1 and/or greater than 2 g/m$^2$ and/or less than 10 and/or less than 7 and/or less than 5 and/or less than 4 g/m$^2$ as determined by the Basis Weight Test Method described herein.

Methods of the Present Invention

The methods of the present invention relate to producing polymeric structures, for example fibrous elements, such as filaments, from aqueous hydroxyl polymer melt compositions comprising a fibrous element-forming polymer, such as a hydroxyl polymer, a crosslinking agent, such as dihydroxyethyleneurea (DHEU), and a dual purpose material, such as an ammonium and/or iminium sulfosuccinate diester salt.

Methods for Making Fibrous Structure

Figure 2:
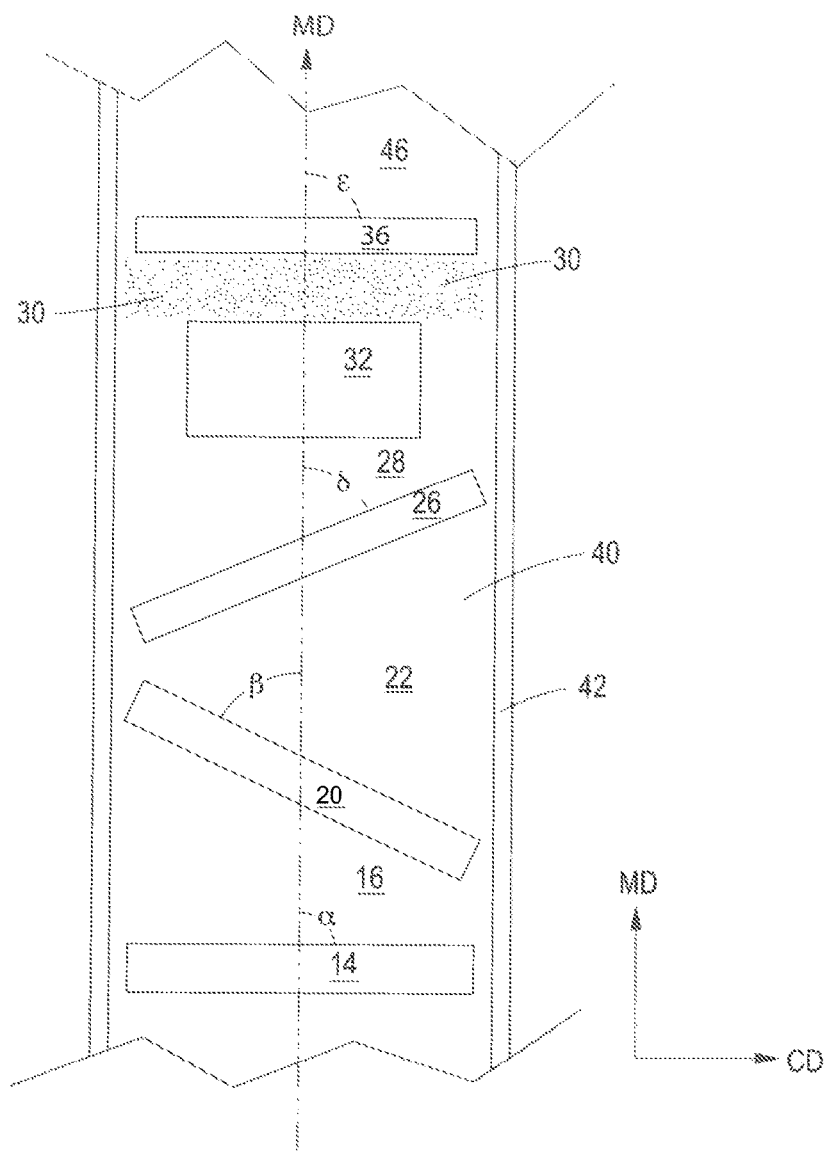
FIG. 2 is a schematic representation of one example of a portion of fibrous structure making process according to the present invention.

FIGS. 1 and 2 illustrate one example of a method for making a fibrous structure of the present invention. As shown in FIGS. 1 and 2, the method 10 comprises the steps of:

a. providing first filaments 12 from a first source 14 of filaments, which form a first layer 16 of filaments;

b. providing second filaments 18 from a second source 20 of filaments, which form a second layer 22 of filaments;

c. providing third filaments 24 from a third source 26 of filaments, which form a third layer 28 of filaments;

d. providing solid additives 30 from a source 32 of solid additives;

e. providing fourth filaments 34 from a fourth source 36 of filaments, which form a fourth layer 38 of filaments; and f. collecting the first, second, third, and fourth filaments 12, 18, 24, 34 and the solid additives 30 to form a fibrous structure 40, wherein the first source 14 of filaments is oriented at a first angle α to the machine direction of the fibrous structure 40, the second source 20 of filaments is oriented at a second angle β to the machine direction different from the first angle α, the third source 26 is oriented at a third angle δ to the machine direction different from the first angle α and the second angle β, and wherein the fourth source 36 is oriented at a fourth angle ε to the machine direction different from the second angle β and third angle δ.

The first, second, and third layers 16, 22, 28 of filaments are collected on a collection device 42, which may be a belt or fabric, with or without the aid of a vacuum box 47. The collection device 42 may be a patterned belt that imparts a pattern, such as a non-random, repeating pattern to the fibrous structure 40 during the fibrous structure making process. The first, second, and third layers 16, 22, 28 of filaments are collected (for example one on top of the other) on the collection device 42 to form a multi-layer nonwoven substrate 44 upon which the solid additives 30 are deposited. The fourth layer 38 of filaments may then be deposited onto the solid additives 30 to form a scrim 46.

The first angle α and the fourth angle ε may be the same angle, for example 90° to the machine direction.

The second angle β and the third angle δ may be the same angle, just positive and negative of one another. For example the second angle β may be −40° to the machine direction and the third angle δ may be +40° to the machine direction.

In one example, at least one of the first, second, and third angles α, β, δ is less than 90° to the machine direction. In another example, the first angle α and/or fourth angle ε is about 90° to the machine direction. In still another example, the second angle β and/or third angle δ is from about ±10° to about ±80° and/or from about ±30° to about ±60° to the machine direction and/or about ±40° to the machine direction.

In one example, the first, second, and third layers 16, 22, 28 of filaments may be formed into a nonwoven substrate 44 prior to being utilized in the process for making a fibrous structure described above. In this case, the nonwoven substrate 44 would likely be in a parent roll that could be unwound into the fibrous structure making process and the solid additives 30 could be deposited directly onto a surface of the nonwoven substrate 44.

In one example, the step of providing a plurality of solid additives 30 onto the nonwoven substrate 44 may comprise airlaying the solid additives 30 using an airlaying former. A non-limiting example of a suitable airlaying former is available from Dan-Web of Aarhus, Denmark.

In one example, the step of providing fourth filaments 34 such that the filaments contact the solid additives 30 comprises the step of depositing the fourth filaments 34 such that at least a portion (in one example all or substantially all) of the solid additives 30 are contacted by the fourth filaments 34 thus positioning the solid additives 30 between the fourth layer 38 of filaments and the nonwoven substrate 44. Once the fourth layer 38 of filaments is in place, the fibrous structure 40 may be subjected to a bonding step that bonds the fourth layer 38 of filaments (in this case, the scrim 46) to the nonwoven substrate 44. This step of bonding may comprise a thermal bonding operation. The thermal bonding operation may comprise passing the fibrous structure 40 through a nip formed by thermal bonding rolls 48, 50. At least one of the thermal bonding rolls 48, 50 may comprise a pattern that is translated into the bond sites 52 formed in the fibrous structure 40.

In addition to being subjected to a bonding operation, the fibrous structure may also be subjected to other post-processing operations such as embossing, tuft-generating, gear rolling, which includes passing the fibrous structure through a nip formed between two engaged gear rolls, moisture-imparting operations, free-fiber end generating, and surface treating to form a finished fibrous structure. In one example, the fibrous structure is subjected to gear rolling by passing the fibrous structure through a nip formed by at least a pair of gear rolls. In one example, the fibrous structure is subjected to gear rolling such that free-fiber ends are created in the fibrous structure. The gear rolling may occur before or after two or more fibrous structures are combined to form a multi-ply sanitary tissue product. If it occurs after, then the multi-ply sanitary tissue product is passed through the nip formed by at least a pair of gear rolls.

The method for making a fibrous structure of the present invention may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure can proceed directly into a converting operation rather than, for example, being convolutedly wound into a roll and then unwound to proceed through a converting operation.

In one example, one or more plies of the fibrous structure according to the present invention may be combined, for example with glue, with another ply of fibrous structure, which may also be a fibrous structure according to the present invention, to form a multi-ply sanitary tissue product that exhibits a Tensile Ratio of 2 or less and/or less than 1.7 and/or less than 1.5 and/or less than 1.3 and/or less than 1.1 and/or greater than 0.7 and/or greater than 0.9 as measured according to the Elongation/Tensile Strength/TEA/Tangent Modulus Test Method described herein. In one example, the multi-ply sanitary tissue product may be formed by combining two or more plies of fibrous structure according to the present invention. In another example, two or more plies of fibrous structure according to the present invention may be combined to form a multi-ply sanitary tissue product such that the solid additives present in the fibrous structure plies are adjacent to each of the outer surfaces of the multi-ply sanitary tissue product.

The process of the present invention may include preparing individual rolls of fibrous structure and/or sanitary tissue product comprising such fibrous structure(s) that are suitable for consumer use.

Figure 3:
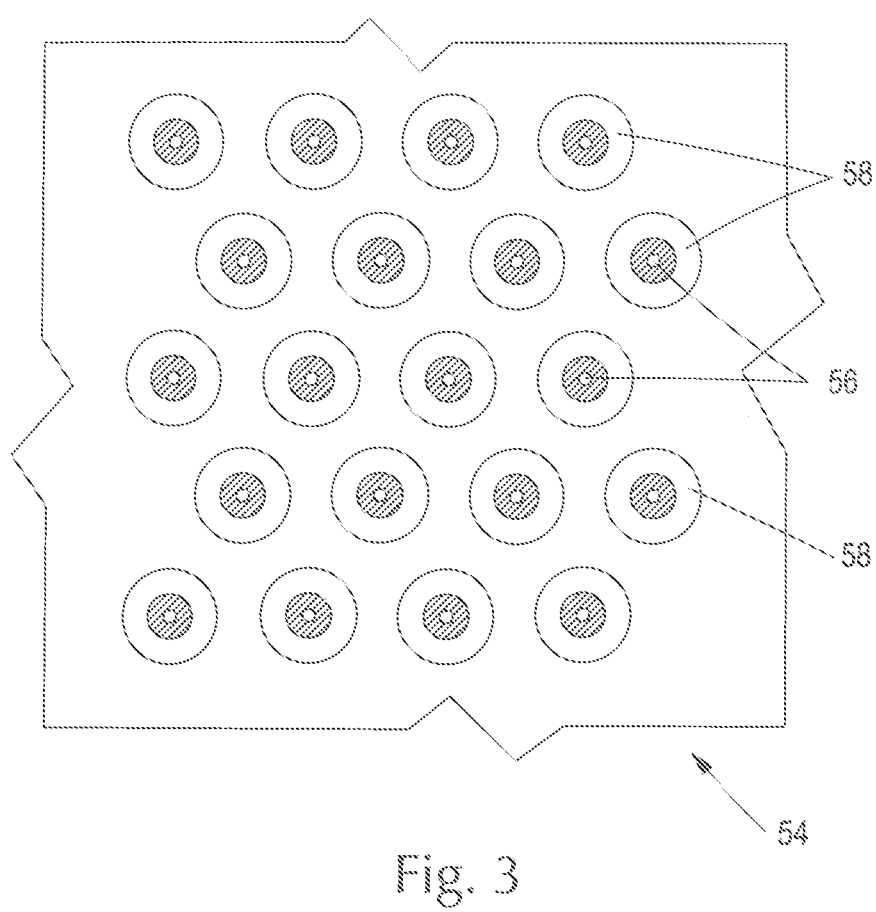
FIG. 3 is a schematic representation of an example of a meltblow die in accordance with the present invention.

In one example, the sources of filaments comprise meltblow dies that produce filaments from an aqueous hydroxyl polymer melt composition according to the present invention. In one example, as shown in FIG. 3 the meltblow die 54 may comprise at least one filament-forming hole 56, and/or 2 or more and/or 3 or more rows of filament-forming holes 56 from which filaments are spun. At least one row of the filament-forming holes 56 contains 2 or more and/or 3 or more and/or 10 or more filament-forming holes 56. In addition to the filament-forming holes 56, the meltblow die 54 comprises fluid-releasing holes 58, such as gas-releasing holes, in one example air-releasing holes, that provide attenuation to the filaments formed from the filament-forming holes 56. One or more fluid-releasing holes 58 may be associated with a filament-forming hole 56 such that the fluid exiting the fluid-releasing hole 58 is parallel or substantially parallel (rather than angled like a knife-edge die) to an exterior surface of a filament exiting the filament-forming hole 56. In one example, the fluid exiting the fluid-releasing hole 58 contacts the exterior surface of a filament formed from a filament-forming hole 56 at an angle of less than 30° and/or less than 20° and/or less than 10° and/or less than 5° and/or about 0°. One or more fluid releasing holes 58 may be arranged around a filament-forming hole 56. In one example, one or more fluid-releasing holes 58 are associated with a single filament-forming hole 56 such that the fluid exiting the one or more fluid releasing holes 58 contacts the exterior surface of a single filament formed from the single filament-forming hole 56. In one example, the fluid-releasing hole 58 permits a fluid, such as a gas, for example air, to contact the exterior surface of a filament formed from a filament-forming hole 56 rather than contacting an inner surface of a filament, such as what happens when a hollow filament is formed.

ii) Foam Formation

The aqueous hydroxyl polymer melt composition for foam formation may be prepared similarly as for fibrous element formation. The dual purpose material solves the same problems as for fiber formation. It may also be advantageous to add a nucleating agent such as microtalc or alkali metal or alkaline earth metal salt such as sodium sulfate or sodium chloride in an amount of about 1-8% of the starch weight. The foam may be shaped into various forms.

iii) Coating Formation

The aqueous hydroxyl polymer melt composition for coating formation may be prepared by adding a methylated melamine formaldehyde resin such as Astromel 400 available from Momentive to a aqueous solution of hydroxyl containing polymer such as a hydroxyethyl acrylate polymer.

Aqueous Hydroxyl Polymer Melt Composition

The aqueous hydroxyl polymer melt composition of the present invention from which the hydroxyl polymer filaments are produced comprises a melt processed fibrous element-forming polymer, such as a melt processed hydroxyl polymer, for example a melt processed polysaccharide, and a crosslinking system comprising a crosslinking agent and a dual purpose material, such as an ammonium and/or iminium sulfosuccinate diester salt, according to the present invention.

The aqueous hydroxyl polymer melt compositions may already be formed or a melt processing step may need to be performed to convert a raw material fibrous element-forming polymer, such as a polysaccharide, into a melt processed fibrous element-forming polymer, such as a melt processed polysaccharide, thus producing the aqueous hydroxyl polymer melt composition. A peak processing temperature to bring the aqueous hydroxyl polymer melt composition to between 170 to 175° C. should be applied to the aqueous hydroxyl polymer melt composition. This can be accomplished by heating through the barrel heating of a twin screw extruder or using a shell in tube heat exchanger. The aqueous hydroxyl polymer melt composition should be held at 170 to 175° C. for 1 to 2 minutes. If the aqueous hydroxyl polymer melt composition is at a peak temperature between 170 and 175° C. for residence times longer than 2 minutes unwanted side reactions may occur. Thus it is important to very quickly cool the aqueous hydroxyl polymer melt composition using a rapid quenching method, such as flash vaporization of the water phase. The crosslinking agent is added to the aqueous hydroxyl polymer melt composition after the cooling step. A suitable melt processing step known in the art may be used to convert the raw material fibrous element-forming polymer, for example the polysaccharide, into the melt processed fibrous element-forming polysaccharide. "Melt processing" as used herein means any operation and/or process by which a polymer is softened to such a degree that it can be brought into a flowable state.

The aqueous hydroxyl polymer melt compositions of the present invention may have a shear viscosity, as measured according to the Shear Viscosity of an Aqueous Hydroxyl Polymer Melt Composition Measurement Test Method described herein, of from about 0.5 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 $sec^{-1}$ and at the processing temperature (50° C. to 100° C.). The aqueous hydroxyl polymer melt compositions may have a thinning index n value as measured according to the Shear Viscosity of an Aqueous Hydroxyl Polymer Melt Composition Measurement Test Method described herein of from about 0.4 to about 1.0 and/or from about 0.5 to about 0.8.

The aqueous hydroxyl polymer melt compositions may have a temperature of from about 50° C. to about 100° C. and/or from about 65° C. to about 95° C. and/or from about 70° C. to about 90° C. when spinning filaments from the aqueous hydroxyl polymer melt compositions.

In one example, the aqueous hydroxyl polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the aqueous hydroxyl polymer melt composition of a fibrous element-forming polymer, such as a polysaccharide. The fibrous element-forming polymer, such as a polysaccharide, may have a weight average molecular weight greater than 100,000 g/mol as determined by the Weight Average Molecular Weight Test Method described herein prior to any crosslinking.

A dual purpose material may be present in the aqueous hydroxyl polymer melt compositions and/or may be added to the aqueous hydroxyl polymer melt composition before polymer processing of the aqueous hydroxyl polymer melt composition.

A non-hydroxyl polymer, such as polyacrylamide and/or an acrylamide-based copolymer, may be present in the aqueous hydroxyl polymer melt composition and/or may be added to the aqueous hydroxyl polymer melt composition before polymer processing of the aqueous hydroxyl polymer melt composition.

A hueing agent may be present in the aqueous hydroxyl polymer melt compositions and/or may be added to the aqueous hydroxyl polymer melt composition before polymer processing the aqueous hydroxyl polymer melt composition.

NON-LIMITING EXAMPLES

The materials used in the Examples are as follows:

CPI 050820-156 is an acid-thinned, dent corn starch with a weight average molecular weight of 2,000,000 g/mol supplied by Corn Products International, Westchester, Ill.

Hyperfloc NF301, a nonionic polyacrylamide (PAAM) has a weight average molecular weight between 5,000,000 and 6,000,000 g/mol, is supplied by Hychem, Inc., Tampa, Fla.

Aerosol MA-80-PG is an anionic sodium dihexyl sulfosuccinate surfactant supplied by Cytec Industries, Inc., Woodland Park, N.J.

Ammonium sulfosuccinic acid (bis-2-ethylhexyl ester) is prepared via two methods outlined in Examples 1 and 2, respectively, below.

Ammonium sulfosuccinic acid (bis-isobutyl ester) is prepared according to Example 3.

Example 1—Synthesis of 50% Ammonium Sulfosuccinic Acid (Bis-2-Ethylhexyl Ester) from Sodium Sulfosucccinic Acid (Bis-2-Ethylhexyl Ester)

Dioctyl sulfosuccinate diester sodium salt (98% from Aldrich) 406 g is dissolved in 600 mL of dichloromethane. Ammonium chloride (462 g) is dissolved in 1387 mL water (25% solution). The two solutions are vigorously stirred in a 4 L beaker and transferred to three 1 L sep funnels. The emulsion starts separating within minutes. After standing overnight, the organic layer is isolated and evaporated with rotary evaporation (410 mm vacuum, 45° C. water bath T) to a liquid with a slight dichloromethane smell which tended to bump. A solution of 132 g propylene glycol: 168 g water is added to the sulfosuccinate solution and evaporated with rotary evaporation (360 mm, 50 C water bath) to give ammonium sulfosuccinic acid (bis-2-ethylhexyl ester), 708 g.

Example 2—Synthesis of 50% Ammonium Sulfosuccinic Acid (Bis-2-Ethylhexyl Ester) from Maleic Acid (Bis-2-Ethylhexyl Ester)

Di-2-ethylhexyl maleate (90% from Aldrich) (300 g, 0.88 mol), ammonium bisulfate (45% from Pfaltz and Bauer) (200.52 g, 0.91 mol), and ammonium sulfosuccinic acid (bis-2-ethylhexyl ester) (from Example 1) (21 g) are charged to a 1 L four neck flask fitted with a mechanical stirrer, temperature probe attached to controller for heating mantle and condenser with nitrogen line. The two phase reaction mixture is stirred with heating to gentle reflux (105° C.) for 7 hours to give a single phase consisting of ammonium sulfosuccinic acid (bis-2-ethylhexyl ester).

Example 3—Synthesis of Ammonium Sulfosuccinic Acid (Bis-Isobutyl Ester)

Ammonium chloride was dissolved in 1078 mL water with heating in a 4 L Erlenmeyer flask. Then Aerosol IB (a sodium diisobutyl sulfosuccinate surfactant) (45% from Cytec) 825 g is added to the ammonium chloride solution along with 600 mL of dichlormethane. The suspension is stirred vigorously for 10 min to give a white emulsion which is transferred to three 1000 mL separatory funnels. The emulsion starts separating within minutes. After standing overnight, the organic layer is isolated and evaporated with rotary evaporation (410 mm vacuum, 45° C. water bath T) to a liquid with a slight dichloromethane smell. Water (300 mL) is added and the solution rotary evaporated to remove residual dichloromethane (325 mm, 55° C. water bath T) to give 44% ammonium sulfosuccinic acid (bis-isobutyl ester), 819.27 g.

Example 4—Comparative Example

Figure 4A:
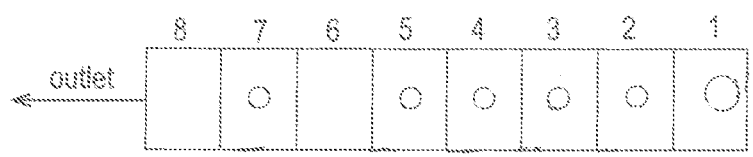
FIG. 4A is a schematic representation of an example of a barrel of a twin screw extruder in accordance with the present invention.
Figure 4B:
FIG. 4B is a schematic representation of an example of a screw and mixing element configuration for the twin screw extruder of FIG. 4A.

In a 40:1 APV Baker twin-screw extruder ("cook extruder") with eight temperature zones, illustrated in FIGS. 4A and 4B, CPI 050820-156 starch (fibrous element-forming polymer) is mixed with 35% ammonium methanesulfonate (crosslinking facilitator), 80% Aerosol MA-80-PG surfactant (fast wetting surfactant), and water in zone 1. This mixture is then conveyed down the barrel through zones 2 through 8 and cooked into a melt-processed hydroxyl polymer composition. The composition in the extruder is 35% water where the make-up of solids is 98% CPI 050820-156, 0.8% Aerosol MA-80-PG surfactant, and 0.8% ammonium methanesulfonate.

The extruder barrel temperature set points for each zone are shown in Table 1 below:

TABLE 1

| | Zone | | | | | | | |
|---|---|---|---|---|---|---|---|---|
| | 1 | 2 | 3 | 4 | 5 | 6 | 7 | 8 |
| Temperature (° C.) | 15 | 15 | 15 | 50 | 160 | 160 | 185 | 185 |

Figure 5A:
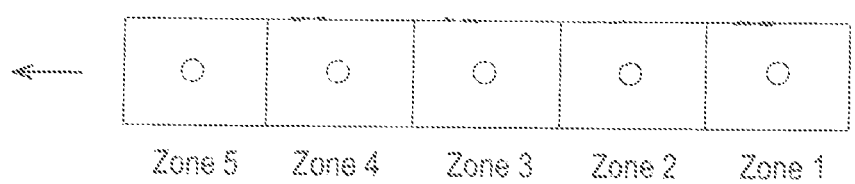
FIG. 5A is a schematic representation of an example of a barrel of a twin screw extruder suitable for use in the present invention.
Figure 5B:
FIG. 5B is a schematic representation of an example of a screw and mixing element configuration suitable for use in the barrel of FIG. 5A.

The temperature of the aqueous hydroxyl polymer melt composition exiting the 40:1 extruder is between 148 and 152° C. From the extruder, the aqueous hydroxyl polymer melt composition is fed to a Mahr gear pump, and then delivered to a second extruder (a "flash extruder"), an example of which is illustrated in FIGS. 5A and 5B. The second extruder is a 13:1 APV Baker twin screw, which serves to cool the melt by venting a stream to atmospheric pressure. The second extruder also serves as a location for additives to the aqueous hydroxyl polymer melt composition. Particularly, stream of 2.2 wt % Hyperfloc NF301 polyacrylamide (non-hydroxyl polymer) is introduced at a level of 0.3% on a solids basis. The material that is not vented is conveyed down the extruder to a second Mahr melt pump. From here, the aqueous hydroxyl polymer melt composition is delivered to a series of static mixers where 20% DHEU crosslinking agent and water are added. The aqueous hydroxyl polymer melt composition at this point in the process is 50-55% total solids. On a solids basis the aqueous hydroxyl polymer melt composition is comprised of 93.5% CPI 050820-156 starch, 4.2% DHEU crosslinking agent, 0.8% ammonium methanesulfonate, 0.8% Aerosol MA-80-PG surfactant, and 0.3% Hyperfloc NF301 PAAM. From the static mixers the aqueous hydroxyl polymer melt composition is delivered to a melt blowing die via a melt pump. Polysaccharide filaments are produced from the aqueous hydroxyl polymer melt composition by the melt blowing die. The filaments are collected on a collection device, such as a belt, for example a patterned belt, to produce a fibrous structure. Specifically the following equipment and equipment operating parameters were used to process the aqueous hydroxyl polymer melt composition into a fibrous element.

As shown in FIG. 6, the aqueous hydroxyl polymer melt composition present in an extruder 102 is pumped to a die 104 using pump 103, such as a Zenith®, type PEP II, having a capacity of 10 cubic centimeters per revolution (cc/rev), manufactured by Parker Hannifin Corporation, Zenith Pumps division, of Sanford, N.C., USA. The aqueous hydroxyl polymer melt composition's flow to die 104 is controlled by adjusting the number of revolutions per minute (rpm) of the pump 103. Pipes connecting the extruder 102, the pump 103, the die 104, and optionally a mixer 116 are electrically heated and thermostatically controlled to 65° C.

Figure 7:
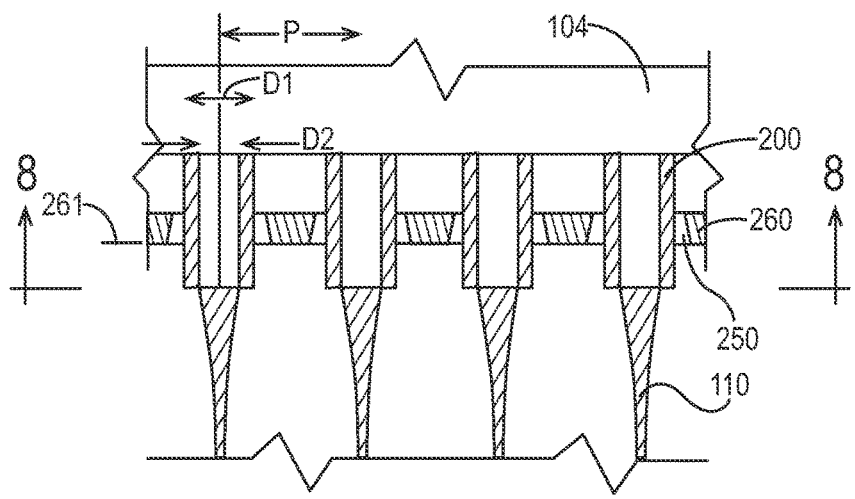
FIG. 7 is a schematic representation of a partial side view of the process shown in FIG. 6 showing an example of an attenuation zone.
Figure 8:
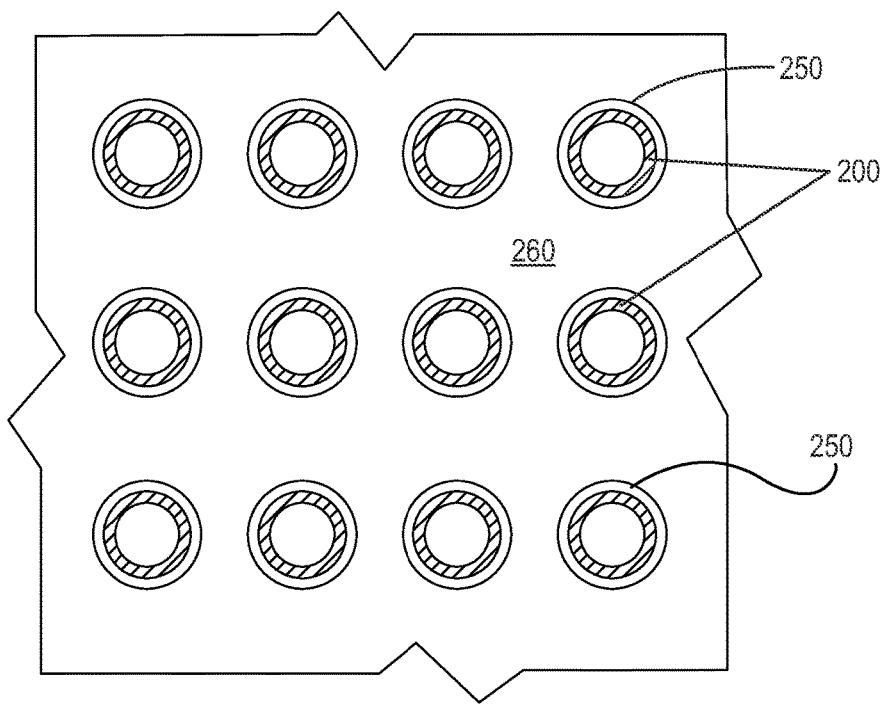
FIG. 8 is a schematic plan view taken along lines 8-8 of FIG. 7 and showing one possible arrangement of a plurality of extrusion nozzles arranged to provide fibrous elements of the present invention.

The die 104 has several rows of circular extrusion nozzles 200 spaced from one another at a pitch P (FIG. 7) of about 2.489 millimeters (about 0.098 inches). The nozzles are arranged in a staggered grid with a spacing of 2.489 millimeters (about 0.098 inches) within rows and a spacing of 2.159 millimeters (about 0.085 inches) between rows. The nozzles 200 have individual inner diameters D2 of about 0.254 millimeters (about 0.010 inches) and individual outside diameters (D1) of about 0.813 millimeters (about 0.032 inches). Each individual nozzle 200 is encircled by an annular orifice 250 formed in a plate 260 (FIGS. 7 and 8) having a thickness of about 1.9 millimeters (about 0.075 inches). A pattern of a plurality of the orifices 250 in the plate 260 correspond to a pattern of extrusion nozzles 200. Once the orifice plate is combined with the dies, the resulting area for airflow is about 36 percent. The plate 260 is fixed so that the embryonic filaments 110 being extruded through the nozzles 200 are surrounded and attenuated by generally cylindrical, humidified air streams supplied through the orifices 250. The nozzles can extend to a distance from about 1.5 mm to about 4 mm, and more specifically from about 2 mm to about 3 mm, beyond a surface 261 of the plate 260 (FIG. 7). As shown in FIG. 9, a plurality of boundary-air orifices 300, is formed by plugging nozzles of two outside rows on each side of the plurality of nozzles, as viewed in plane, so that each of the boundary-layer orifice comprised a annular aperture 250 described herein above. Additionally, every other row and every other column of the remaining capillary nozzles are blocked, increasing the spacing between active capillary nozzles As shown in FIG. 6, attenuation air can be provided by heating compressed air from a source 106 by an electrical-resistance heater 108, for example, a heater manufactured by Chromalox, Division of Emerson Electric, of Pittsburgh, Pa., USA. An appropriate quantity of steam 105 at an absolute pressure of from about 240 to about 420 kiloPascals (kPa), controlled by a globe valve (not shown), is added to saturate or nearly saturate the heated air at the conditions in the electrically heated, thermostatically controlled delivery pipe 115. Condensate is removed in an electrically heated, thermostatically controlled, separator 107. The attenuating air has an absolute pressure from about 130 kPa to about 310 kPa, measured in the pipe 115. The filaments 110 being extruded have a moisture content of from about 20% and/or from about 25% to about 50% and/or to about 55% by weight. The filaments 110 are dried by a drying air stream 109 having a temperature from about 149° C. (about 300° F.) to about 315° C. (about 600° F.) by an electrical resistance heater (not shown) supplied through drying nozzles 112 and discharged at an angle generally perpendicular relative to the general orientation of the embryonic fibers being extruded. The filaments 110 are dried from about 45% moisture content to about 15% moisture content (i.e., from a consistency of about 55% to a consistency of about 85%) and are collected on a collection device 111, such as, for example, a movable foraminous belt.

The process parameters are as follows in Table 2 below.

TABLE 2

| Sample | Units | |
|---|---|---|
| Attenuation Air Flow Rate | G/min | 9000 |
| Attenuation Air Temperature | ° C. | 65 |
| Attenuation Steam Flow Rate | G/min | 1800 |
| Attenuation Steam Gage Pressure | kPa | 213 |
| Attenuation Gage Pressure in Delivery Pipe | kPa | 14 |
| Attenuation Exit Temperature | ° C. | 65 |
| Solution Pump Speed | Revs/min | 12 |
| Solution Flow | G/min/hole | 0.18 |
| Drying Air Flow Rate | g/min | 17000 |
| Air Duct Type | | Slots |
| Air Duct Dimensions | mm | 356 × 127 |
| Velocity via Pitot-Static Tube | M/s | 65 |
| Drying Air Temperature at Heater | ° C. | 260 |
| Dry Duct Position from Die | mm | 80 |
| Drying Duct Angle Relative to Fibers | degrees | 0 |
| Drying Duct to Drying Duct Spacing | mm | 205 |

TABLE 2-continued

| Sample | Units | |
|---|---|---|
| Die to Forming Box distance | Mm | 610 |
| Forming Box Machine direction Length | Mm | 635 |
| Forming Box Cross Direction Width | Mm | 380 |
| Forming Box Flowrate | g/min | 41000 |

Fibrous elements are formed from the aqueous hydroxyl polymer melt composition in accordance with the present invention. Fibrous elements are formed at a drying air flows (21620 g/min) and are collected on a moving foraminous belt. A vacuum is used to remove air while leaving the fibers to form as a fibrous structure on the belt. The belt transports the fibrous structure to subsequent equipment, all of which operate at about 0.20 meters/second (40 feet/minute). The fibrous structure feeds through a thermal bonding nip consisting of two heated metal rolls. The rolls are 0.133 meters in diameter and are heated to about 199° C. (390° F.). One roll is smooth, the other has square knobs representing 12.8% of the surface area; the knobs are 0.508 mm wide on a 1.499 mm grid. The rolls are loaded with about 18900 Newtons per linear meter of roll (about 108 pounds per linear inch). The fibrous structure continues to a heating oven cure the fibrous structure. The fibrous structure is supported on a separate foraminous belt and feeds through a 1.054 meter long oven operating at 206° C. (403° F.) circulating about 13600 grams per minute of heated air. Heat transfer to the polymeric structure and thus polymeric structure temperature is a function of the air flow and air temperature. The cure temperature can be achieved by adjusting air flow and air temperature. The fibrous structure continues to another foraminous belt where the fibrous structure is humidified to about 7 percent moisture by the addition of steam. Steam is supplied by an Armstrong International series 9000 conditioned-steam humidifier. Finally the fibrous structure is wound onto a paper core.

The cured fibrous structure are characterized by basis weight, initial total wet tensile, dry peak TEA and dry fail stretch and fiber diameter according to their respective Test Methods described herein. Prior to testing, samples are conditioned overnight at a relative humidity of 48% to 50% and within a temperature range of 22° C. to 24° C.

The resulting fibrous structure exhibits a basis weight of 24 g/m$^2$, a Fail Total Energy Absorption (TEA) of 31 g/in, a Total Dry Tensile of 488 g/in, a % Elongation of 18% and a Initial Total Wet Tensile of 45 g/in and fiber diameter of 7.19 μm. Conductivity of 1% aqueous suspension=137.6 microsiemens as measured by their respective test methods described herein.

Example 5—Inventive Example

An aqueous hydroxyl polymer melt composition is prepared as described in Example 4 above except that the CPI 050820-156 starch (fibrous element-forming polymer) is mixed with 50% ammonium bis(2-ethylhexyl ester) sulfosuccinate (dual purpose material) in place of both the ammonium methanesulfonate (crosslinking facilitator) and Aerosol MA-80-PG surfactant (fast wetting surfactant), and water in zone 1. This mixture, on a solids basis, is converted to the aqueous hydroxyl polymer melt composition comprised of 93.5% CPI 050820-156 starch, 4.2% DHEU crosslinking agent, 0.8% ammonium bis(2-ethylhexyl ester) sulfosuccinate (dual purpose material), and 0.3% Hyperfloc NF301 PAAM (non-hydroxyl polymer), spun into fibrous elements, and converted into a fibrous structure exhibiting a basis weight of 24 g/m², a Fail Total Energy Absorption (TEA) of 47 g/in, a Total Dry Tensile of 456 g/in, and a % Elongation of 27% and a Initial Total Wet Tensile of 51 g/in and fiber diameter of 6.74 μm. Conductivity of 1% aqueous suspension=58.9 microsiemens as measured by their respective test methods described herein.

Example 6—Inventive Example

An aqueous hydroxyl polymer melt composition is prepared as described in Example 4 except that the CPI 050820-156 starch (fibrous element-forming polymer) is mixed with 50% ammonium bis(isobutyl ester) sulfosuccinate (dual purpose material) in place of both the ammonium methanesulfonate (crosslinking facilitator) and Aerosol MA-80-PG surfactant (fast wetting surfactant), and water in zone 1. This mixture, on a solids basis, is converted to the aqueous hydroxyl polymer melt composition comprised of 93.5% CPI 050820-156 starch, 4.2% DHEU crosslinking agent, 0.8% ammonium bis(isobutyl ester) sulfosuccinate, and 0.3% Hyperfloc NF301 PAAM (non-hydroxyl polymer), spun into fibrous elements, and converted into a fibrous structure exhibiting a basis weight of 24 g/m², a Fail Total Energy Absorption (TEA) of 49 g/in, a Total Dry Tensile of 606 g/in, and a % Elongation of 23% and a Initial Total Wet Tensile of 54 g/in and fiber diameter of 6.96 μm. Conductivity of 1% aqueous suspension=77.0 microsiemens as measured by their respective test methods described herein.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Conductivity Test Method

A 3 g sample of filaments and/or fibrous structure and/or sanitary tissue product is ground in an IKA Mill for 1 min. A 1% suspension was prepared with 1.00 g of the ground filaments and/or fibrous structure in deionized water. The sample was magnetically stirred for 5 minutes and the conductivity determined with a VWR—Control Company conductivity meter or equivalent conductivity meter with an accuracy of ±2% microsiemens.

Basis Weight Test Method

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 8.890 cm±0.00889 cm 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in g/m² as follows:

Basis Weight=(Mass of stack)/[(Area of 1 square in stack)×(No. of squares in stack)]

Basis Weight (g/m²)=Mass of stack (g)/[79.032 (cm²)/10,000 (cm²/m²)×12]

Report result to the nearest 0.1 g/m². Sample dimensions can be changed or varied using a similar precision cutter as mentioned above, so as at least 645 square centimeters of sample area is in the stack.

Caliper Test Method

Caliper of a fibrous structure and/or sanitary tissue product is measured using a ProGage Thickness Tester (Thwing-Albert Instrument Company, West Berlin, N.J.) with a pressure foot diameter of 2.00 inches (area of 3.14 in²) at a pressure of 95 g/in². Four (4) samples are prepared by cutting of a usable unit such that each cut sample is at least 2.5 inches per side, avoiding creases, folds, and obvious defects. An individual specimen is placed on the anvil with the specimen centered underneath the pressure foot. The foot is lowered at 0.03 in/sec to an applied pressure of 95 g/in². The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Density Test Method

The density of a fibrous structure and/or sanitary tissue product is calculated as the quotient of the Basis Weight of a fibrous structure or sanitary tissue product expressed in lbs/3000 ft² divided by the Caliper (at 95 g/in²) of the fibrous structure or sanitary tissue product expressed in mils. The final Density value is calculated in lbs/ft³ and/or g/cm³, by using the appropriate converting factors.

Average Diameter Test Method

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Elongation/Tensile Strength/TEA/Tangent Modulus Test Method

Elongation (Stretch), Tensile Strength, TEA and Tangent Modulus are measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing-Albert JDC-1-10, or similar) take a CD stack and cut one, 1.00 in ±0.01 in wide by 3-4 in long stack of strips (long dimension in CD). In like fashion cut the remaining stack in the MD (strip's long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gage length to 1.00 inch. Zero the crosshead and load cell. Insert the specimen into the upper and lower open grips such that at least 0.5 inches of specimen length is contained in each grip. Align specimen vertically within the upper and lower jaws, then close the upper grip. Verify specimen is aligned, then close lower grip. The specimen should be fairly straight between grips, with no more than 5.0 g of force on the load cell. Add a pre-tension force of 3 g. This tension is applied to the specimen to define the adjusted gauge length, and, by definition is the zero strain point. Start the tensile tester and data collection. Repeat testing in like fashion for all four CD and four MD specimens. Program the software to calculate the following from the constructed force (g) versus extension (in) curve.

Eight samples are run on the Tensile Tester (four to the MD and four to the CD) and average of the respective dry total tensile, dry Fail TEA and dry Fail Stretch is reported as the Dry Total Tensile, Dry Fail TEA and Dry Fail Stretch. Fail TEA is defined as tensile energy absorbed (area under the load vs. strain tensile curve) from zero strain to fail force point, with units of g/in. Dry Fail Stretch is defined as the percentage strain measured after the web is strained past its peak load point, where the force drops to exactly 50% of its peak load force.

The dry Fail TEA is then divided by the basis weight of the strip from which it was tested to arrive at the TEA of the present invention, and is calculated as follows:

TEA=Fail TEA/Basis Weight of Strip (g/m$^2$)

The MD and CD dry tensile strengths are determined using the above equipment and calculations in the following manner.

Tensile Strength in general is the maximum peak force (g) divided by the specimen width (1 in), and reported as g/in to the nearest 1 g/in.

Average Tensile Strength=sum of tensile loads measures (MD)/(Number of tensile stripes tested (MD)*Number of useable units or plys per tensile stripe)

This calculation is repeated for cross direction testing.

Dry Total Tensile=Average MD tensile strength+ Average CD tensile strength

The Dry Tensile value is then normalized for the basis weight of the strip from which it was tested. The normalized basis weight used is 24 g/m$^2$, and is calculated as follows:

Normalized {DTT}={DTT}*24 (g/m$^2$)/Basis Weight of Strip (g/m$^2$)

The various values are calculated for the four CD specimens and the four MD specimens. Calculate an average for each parameter separately for the CD and MD specimens.

Initial Total Wet Tensile Test Method

Cut tensile strips precisely in the direction indicated; four to the machine direction (MD) and four to the cross direction (CD). Cut the sample strips 4 in. (101.6 mm) long and exactly 1 in. (25.4 mm) wide using an Alpha Precision Sample Cutter Model 240-7A (pneumatic): Thwing-Albert Instrument Co and an appropriate die.

An electronic tensile tester (Thwing-Albert EJA Vantage Tester, Thwing-Albert Instrument Co., 10960 Dutton Rd., Philadelphia, Pa., 19154) is used and operated at a crosshead speed of 4.0 inch (about 10.16 cm) per minute, using a strip of a fibrous structure of 1 inch wide and a length of about 4 inches long. The gauge length is set to 1 inch. The strip is inserted into the jaws with the 1 inch wide section in the clamps, verifying that the sample is hanging straight into the bottom jaw. The sample is then pre-loaded with 20-50 g/in of pre-load force. This tension is applied to the web to define the adjusted gauge length, and, by definition is the zero strain point. The sample is then wet thoroughly with water using a syringe to gently apply the water on the uppermost portion of the web sample inside the jaws. Crosshead movement is then initiated within 3-8 seconds after initial water contact. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

Initial Total Wet Tensile=ITWT (g$_f$/inch)=Peak Load$_{MD}$ (g$_f$)/2 (inch$_{width}$)+Peak Load$_{CD}$ (g$_f$)/2 (inch$_{width}$)

The Initial Total Wet Tensile value is then normalized for the basis weight of the strip from which it was tested. The normalized basis weight used is 24 g/m², and is calculated as follows:

Normalized {ITWT}={ITWT}*24 (g/m²)/Basis Weight of Strip (g/m²)

In one example, the initial total wet tensile of a polymeric structure, such as a fibrous structure, of the present invention is at least 1.18 g/cm (3 g/in) and/or at least 1.57 g/cm (4 g/in) and/or at least 1.97 g/cm (5 g/in) then the crosslinking system is acceptable. The initial total wet tensile may be less than or equal to about 23.62 g/cm (60 g/in) and/or less than or equal to about 21.65 g/cm (55 g/in) and/or less than or equal to about 19.69 g/cm (50 g/in).

Weight Average Molecular Weight Test Method

The weight average molecular weight (Mw) of a material, such as a hydroxyl polymer is determined by Gel Permeation Chromatography (GPC) using a mixed bed column. A high performance liquid chromatograph (HPLC) having the following components: Millenium®, Model 600E pump, system controller and controller software Version 3.2, Model 717 Plus autosampler and CHM-009246 column heater, all manufactured by Waters Corporation of Milford, Mass., USA, is utilized. The column is a PL gel 20 μm Mixed A column (gel molecular weight ranges from 1,000 g/mol to 40,000,000 g/mol) having a length of 600 mm and an internal diameter of 7.5 mm and the guard column is a PL gel 20 μm, 50 mm length, 7.5 mm ID. The column temperature is 55° C. and the injection volume is 200 μL. The detector is a DAWN® Enhanced Optical System (EOS) including Astra® software, Version 4.73.04 detector software, manufactured by Wyatt Technology of Santa Barbara, Calif., USA, laser-light scattering detector with K5 cell and 690 nm laser. Gain on odd numbered detectors set at 101. Gain on even numbered detectors set to 20.9. Wyatt Technology's Optilab® differential refractometer set at 50° C. Gain set at 10. The mobile phase is HPLC grade dimethylsulfoxide with 0.1% w/v LiBr and the mobile phase flow rate is 1 mL/min, isocratic. The run time is 30 minutes.

A sample is prepared by dissolving the material in the mobile phase at nominally 3 mg of material/1 mL of mobile phase. The sample is capped and then stirred for about 5 minutes using a magnetic stirrer. The sample is then placed in an 85° C. convection oven for 60 minutes. The sample is then allowed to cool undisturbed to room temperature. The sample is then filtered through a 5 μm Nylon membrane, type Spartan-25, manufactured by Schleicher & Schuell, of Keene, N.H., USA, into a 5 milliliter (mL) autosampler vial using a 5 mL syringe.

For each series of samples measured (3 or more samples of a material), a blank sample of solvent is injected onto the column. Then a check sample is prepared in a manner similar to that related to the samples described above. The check sample comprises 2 mg/mL of pullulan (Polymer Laboratories) having a weight average molecular weight of 47,300 g/mol. The check sample is analyzed prior to analyzing each set of samples. Tests on the blank sample, check sample, and material test samples are run in duplicate. The final run is a run of the blank sample. The light scattering detector and differential refractometer is run in accordance with the "Dawn EOS Light Scattering Instrument Hardware Manual" and "Optilab® DSP Interferometric Refractometer Hardware Manual," both manufactured by Wyatt Technology Corp., of Santa Barbara, Calif., USA, and both incorporated herein by reference.

The weight average molecular weight of the sample is calculated using the detector software. A dn/dc (differential change of refractive index with concentration) value of 0.066 is used. The baselines for laser light detectors and the refractive index detector are corrected to remove the contributions from the detector dark current and solvent scattering. If a laser light detector signal is saturated or shows excessive noise, it is not used in the calculation of the molecular mass. The regions for the molecular weight characterization are selected such that both the signals for the 90° detector for the laser-light scattering and refractive index are greater than 3 times their respective baseline noise levels. Typically the high molecular weight side of the chromatogram is limited by the refractive index signal and the low molecular weight side is limited by the laser light signal.

The weight average molecular weight can be calculated using a "first order Zimm plot" as defined in the detector software. If the weight average molecular weight of the sample is greater than 1,000,000 g/mol, both the first and second order Zimm plots are calculated, and the result with the least error from a regression fit is used to calculate the molecular mass. The reported weight average molecular weight is the average of the two runs of the material test sample.

Whiteness Index Test Method

Color (in this case Whiteness) is measured using a diffuse/8° sphere spectrophotometer (X-Rite SP62). The spectrophotometer is calibrated against a white and a black ceramic tile according to manufacturer's instructions and set to calculate Hunter values (L, a, b) with $C^2$ illuminant.

The color measurement of a fibrous structure is performed by stacking a two or more usable units of the fibrous structure on top of one another such that a basis weight of the stacked usable units of at least 100 g/m² is achieved for the area of the stack of usable units to be measured within the measurement area of the spectrophotometer. The stack of usable units is then placed flat against a white ceramic tile background.

Absolute color values of the fibrous structure are determined by taking the average of nine absolute color value measurements from both the top and the bottom surfaces on the stack of usable units.

Whiteness Index (WI) of the fibrous structure is calculated using the Stensby equation:

$$WI = L - 3b + 3a$$

Shear Viscosity of an Aqueous Hydroxyl Polymer Melt Composition Measurement Test Method The shear viscosity of an aqueous hydroxyl polymer melt composition comprising a crosslinking system is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the aqueous hydroxyl polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and γ is the shear rate. The reported apparent shear viscosity of the composition herein is calculated from an interpolation to a shear rate of 3,000 sec$^{-1}$ using the power law relation.

Aqueous Hydroxyl Polymer Melt Composition pH Test Method

An aqueous hydroxyl polymer melt composition's pH is determined by adding 25 mL of the aqueous hydroxyl polymer melt composition to 100 mL of deionized water, stirring with a spatula for 1 min and measuring the pH.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous element comprising a fibrous element-forming polymer and a dual purpose material, wherein the dual purpose material exhibits both a crosslinking facilitator function and a fast wetting surfactant function within the same dual purpose material, wherein the dual purpose material has the following Formula I:

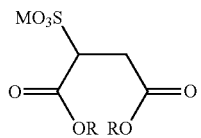

wherein MO$_3$S consists of M$^+$ and $^-$O$_3$S, where M$^+$ is an ammonium or iminium cation; and R$^2$ is independently selected from the group consisting of: alkyl, hydroxyalkyl, alkanolamine, aryl, hydroxylaryl, or part of a heterocyclic ring, and where R is a C$_1$-C$_{18}$ linear or branched alkyl and/or a C$_1$-C$_{12}$ linear or branched alkyl and/or a C$_1$-C$_8$ linear or branched alkyl group.

2. The fibrous element according to claim 1 wherein the fibrous element-forming polymer comprises a hydroxyl polymer.

3. The fibrous element according to claim 2 wherein the hydroxyl polymer comprises a polysaccharide.

4. The fibrous element according to claim 3 wherein the polysaccharide is selected from the group consisting of: starch, starch derivatives, starch copolymers, chitosan, chitosan derivatives, chitosan copolymers, cellulose, cellulose derivatives, cellulose copolymers, hemicellulose, hemicellulose derivatives, hemicellulose copolymers, and mixtures thereof.

5. The fibrous element according to claim 1 wherein the fibrous element further comprises a crosslinking agent is selected from the group consisting of: imidazolidinones, polycarboxylic acids, and mixtures thereof.

6. The fibrous element according to claim 5 wherein the crosslinking agent comprises an imidazolidinone.

7. The fibrous element according to claim 6 wherein the imidazolidinone is dihydroxyethyleneurea.

8. The fibrous element according to claim 1 wherein the dual purpose material is selected from the group consisting of: ammonium sulfosuccinate diester salts, iminium sulfosuccinate diester salts, and mixtures thereof.

9. The fibrous element according to claim 1 wherein M$^+$ is an ammonium or iminium cation $^+$NH$_n$R$^2_{4-n}$ where n is 0-4.

10. The fibrous element according to claim 1 wherein the dual purpose material is produced from an amine and a sulfosuccinic acid diester.

11. The fibrous elements according to claim 1 wherein the dual purpose material is selected from the group consisting of: sulfosuccinic acid bis (isobutyl ester) ammonium salt; sulfosuccinic acid bis(pentyl ester) ammonium salt; sulfosuccinic acid bis(2-ethylhexyl ester) ammonium salt where the ammonium cation is derived from ammonia, dimethylaminoethanol, diethylaminoethanol, dimethylaminopropanol, 2-amino-2-methyl-1-propanol, methyldiethanolamine, 4-ethylmorpholine, 4-methylmorpholine, 4,4-dimethyloxazolidine.

12. The fibrous element according to claim 1 wherein the fibrous element further comprises a non-hydroxyl polymer selected from the group consisting of: polyacrylamide and its derivatives; polyacrylic acid, polymethacrylic acid, and their esters; polyethyleneimine; copolymers made from mixtures of monomers of the aforementioned polymers; and mixtures thereof.

13. The fibrous element according to claim 1 wherein the fibrous element comprises a filament.

14. The fibrous element according to claim 1 wherein the fibrous element exhibits an average diameter of less than 50 μm as measured according to the Average Diameter Test Method.

15. A fibrous structure comprising a plurality of fibrous elements according to claim 1.

16. The fibrous structure according to claim 15 wherein the fibrous structure further comprises one or more solid additives.

17. The fibrous structure according to claim 16 wherein at least one of the solid additives comprises a naturally occurring fiber.

18. The fibrous structure according to claim 16 wherein the fibrous structure further comprises a scrim connected to the surface of the fibrous structure such that the solid additives are positioned between the scrim and a surface of a nonwoven substrate of the fibrous structure.

19. An aqueous hydroxyl polymer melt composition comprising a fibrous element-forming polymer and a dual purpose material that exhibits both a crosslinking facilitator function and a fast wetting surfactant function within the same dual purpose material, wherein the dual purpose material has the following Formula I:

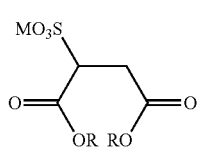

wherein MOSS consists of $M^+$ and $^-O_3S$, where $M^+$ is an ammonium or iminium cation; and $R^2$ is independently selected from the group consisting of: alkyl, hydroxyalkyl, alkanolamine, aryl, hydroxylaryl, or part of a heterocyclic ring, and where R is a $C_1$-$C_{18}$ linear or branched alkyl and/or a $C_1$-$C_{12}$ linear or branched alkyl and/or a $C_1$-$C_8$ linear or branched alkyl group.

* * * * *